US012614319B2

(12) United States Patent
Togawa et al.

(10) Patent No.: US 12,614,319 B2
(45) Date of Patent: Apr. 28, 2026

(54) COMPUTER-READABLE RECORDING MEDIUM STORING AVATAR GENERATING PROGRAM, AVATAR GENERATING METHOD, AND INFORMATION PROCESSING DEVICE

(71) Applicant: Fujitsu Limited, Kawasaki (JP)

(72) Inventors: Taro Togawa, Kawasaki (JP);
Katsuhisa Nakazato, Kawasaki (JP);
Shun Kohata, Sydney (AU)

(73) Assignee: Fujitsu Limited, Kawasaki (JP)

( * ) Notice: Subject to any disclaimer, the term of this patent is extended or adjusted under 35 U.S.C. 154(b) by 140 days.

(21) Appl. No.: 18/782,314

(22) Filed: Jul. 24, 2024

(65) Prior Publication Data

US 2025/0045977 A1 Feb. 6, 2025

(30) Foreign Application Priority Data

Aug. 1, 2023 (JP) ................................. 2023-125785

(51) Int. Cl.
*G06T 11/00* (2026.01)
*G06Q 30/015* (2023.01)
(Continued)

(52) U.S. Cl.
CPC ............ *G06T 11/00* (2013.01); *G06Q 30/015* (2023.01); *G06V 10/762* (2022.01);
(Continued)

(58) Field of Classification Search
CPC .. G06T 11/00; G06Q 30/015; G06Q 30/0268; G06Q 30/0269; G06Q 30/0276;
(Continued)

(56) References Cited

U.S. PATENT DOCUMENTS

2014/0244429 A1* 8/2014 Clayton ............. G06Q 30/0631
705/26.7
2014/0244447 A1* 8/2014 Kim ................... G06Q 30/0643
705/27.2
(Continued)

FOREIGN PATENT DOCUMENTS

JP 2023-094868 7/2023

OTHER PUBLICATIONS

Rosenberg, L. (Oct. 2022). Marketing in the Metaverse and the Need for Consumer Protections. In 2022 IEEE 13th Annual Ubiquitous Computing, Electronics & Mobile Communication Conference (UEMCON) (pp. 0035-0039). IEEE.*
(Continued)

*Primary Examiner* — Sarah Lhymn
(74) *Attorney, Agent, or Firm* — Fujitsu Intellectual Property Center

(57) ABSTRACT

A non-transitory computer-readable recording medium storing an avatar generating program for causing a computer to execute process includes: acquiring a video obtained by imaging an area that includes a product shelf on which a product is arranged; specifying a behavior of a person and a feature regarding the person by analyzing the acquired video; classifying the specified feature based on a predetermined condition; acquiring a customer service style that is expressed by an avatar displayed in a visually recognizable manner for each person and that is for the product; calculating an occurrence rate of a behavior related to purchase of the product, for each classified feature, based on the specified behavior, for the customer service style; and updating the customer service style, for each classified feature, based on the occurrence rate.

18 Claims, 24 Drawing Sheets

(51) Int. Cl.

| | |
|---|---|
| *G06V 10/762* | (2022.01) |
| *G06V 10/764* | (2022.01) |
| *G06V 20/40* | (2022.01) |
| *G06V 40/20* | (2022.01) |

(52) U.S. Cl.
CPC ............ *G06V 10/764* (2022.01); *G06V 20/46* (2022.01); *G06V 40/20* (2022.01)

(58) Field of Classification Search
CPC ............ G06Q 30/0254; G06V 10/762; G06V 10/764; G06V 20/46; G06V 40/20
See application file for complete search history.

(56) References Cited

U.S. PATENT DOCUMENTS

| | | | | |
|---|---|---|---|---|
| 2014/0282586 | A1* | 9/2014 | Shear | G06F 9/5072 |
| | | | | 718/104 |
| 2017/0255831 | A1* | 9/2017 | Bernal | G06V 20/41 |
| 2018/0165863 | A1* | 6/2018 | Kubo | A63F 13/25 |
| 2021/0158781 | A1* | 5/2021 | Imamura | G06Q 10/40 |
| 2022/0293091 | A1* | 9/2022 | Pan | G10L 25/63 |
| 2022/0384027 | A1 | 12/2022 | Kaleal et al. | |
| 2023/0206633 | A1 | 6/2023 | Kohata | |
| 2023/0368499 | A1* | 11/2023 | Lee | G06V 10/761 |

OTHER PUBLICATIONS

Singh, S. (2020). Impact of Neuromarketing Applications on Consumer. Journal of Business and Management, 26(2), 33-52.*

Rombach, R. et al., "High-Resolution Image Synthesis with Latent Diffusion Models", Proceedings of the IEEE/CVF Conference on Computer Vision and Pattern Recognition, pp. 10684-10695, 2022.

Zhang et al., "StyleAvatar3D: Leveraging Image-Text Diffusion Models for High-Fidelity 3D Avatar Generation", arxiv.org, Cornell Univercity Ithaca, NY 14853, May 30, 2023, XP091523190. Cited in EESR dated Sep. 17, 2024 for corresponding European Patent Application No. 24190295.6.

EESR—Extended European Search Report dated Sep. 17, 2024 from corresponding to European Patent Application No. 24190295.6 [10 pages]. **US2023/206633A1 cited in the EESR was previously submitted in the IDS filed on Jul. 24, 2024.

* cited by examiner

FIG. 1

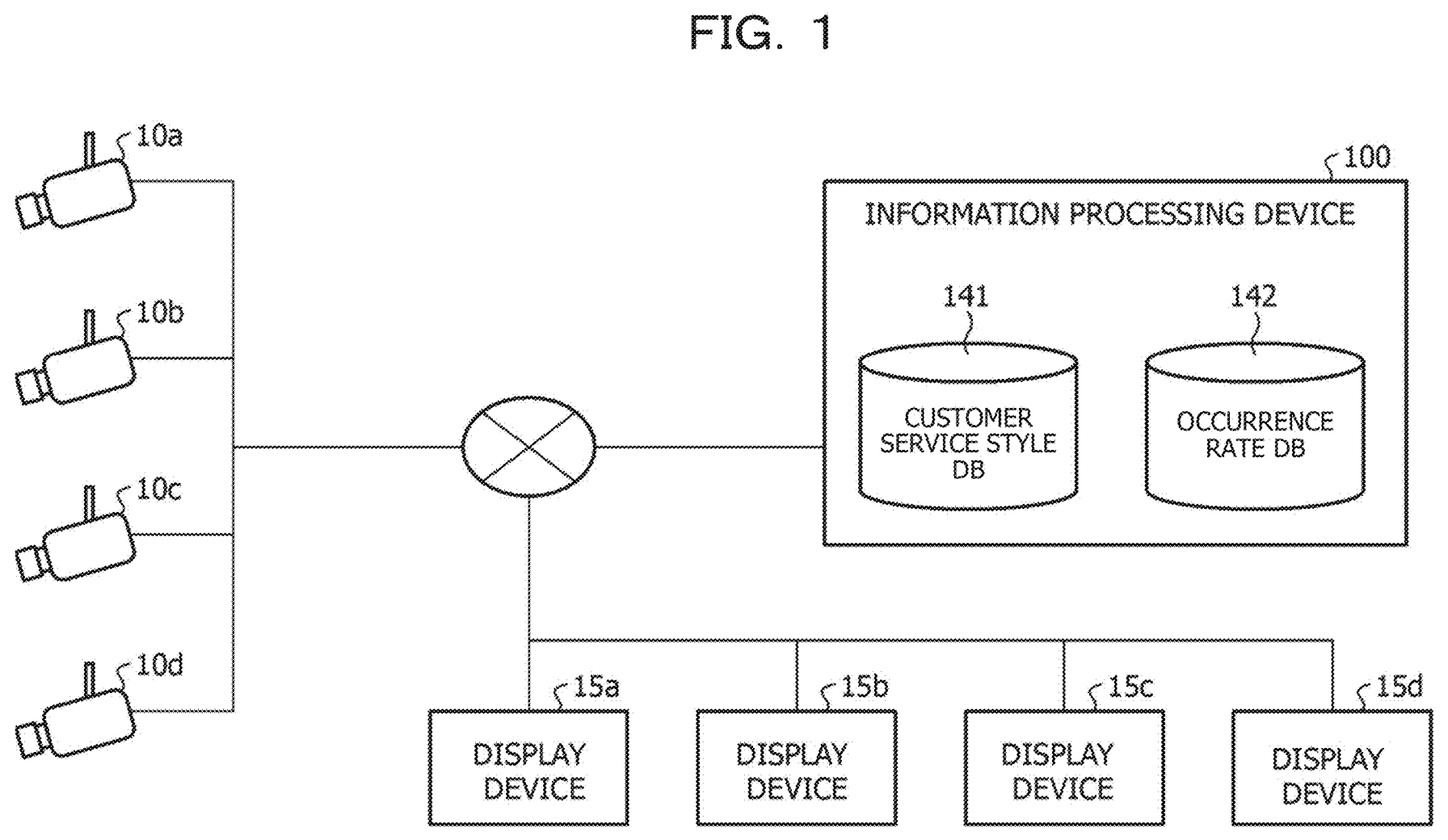

INFORMATION PROCESSING DEVICE ~100

CUSTOMER SERVICE STYLE DB ~141

OCCURRENCE RATE DB ~142

DISPLAY DEVICE ~15a

DISPLAY DEVICE ~15b

DISPLAY DEVICE ~15c

DISPLAY DEVICE ~15d

| | 20-1 | 20-2 | 20-3 ⌐141 |
|---|---|---|---|
| PROMPT | cool: 1.0<br>intelligent: 1.0<br>posh: 1.0 | (base) | caring: 1.0<br>sweet: 1.0<br>casual: 1.0 |
| FIRST ATTRIBUTE<br>(FEMALE IN HER<br>TWENTIES) | 33% | 33% | 33% |
| SECOND ATTRIBUTE<br>(MALE IN HIS FORTIES) | 33% | 33% | 33% |
| ... | ... | ... | ... |

FIG. 3

| | 20-1 | 20-2 | 20-3 | 142 |
|---|---|---|---|---|
| PROMPT | cool: 1.0<br>intelligent: 1.0<br>posh: 1.0 | (base) | caring: 1.0<br>sweet: 1.0<br>casual: 1.0 | |
| FIRST ATTRIBUTE (FEMALE IN HER TWENTIES) | 15%<br>(15/100) | 60%<br>(60/100) | 25%<br>(25/100) | |
| SECOND ATTRIBUTE (MALE IN HIS FORTIES) | 70%<br>(70/100) | 20%<br>(20/100) | 10%<br>(10/100) | |
| ... | ... | ... | ... | |

FIG. 5

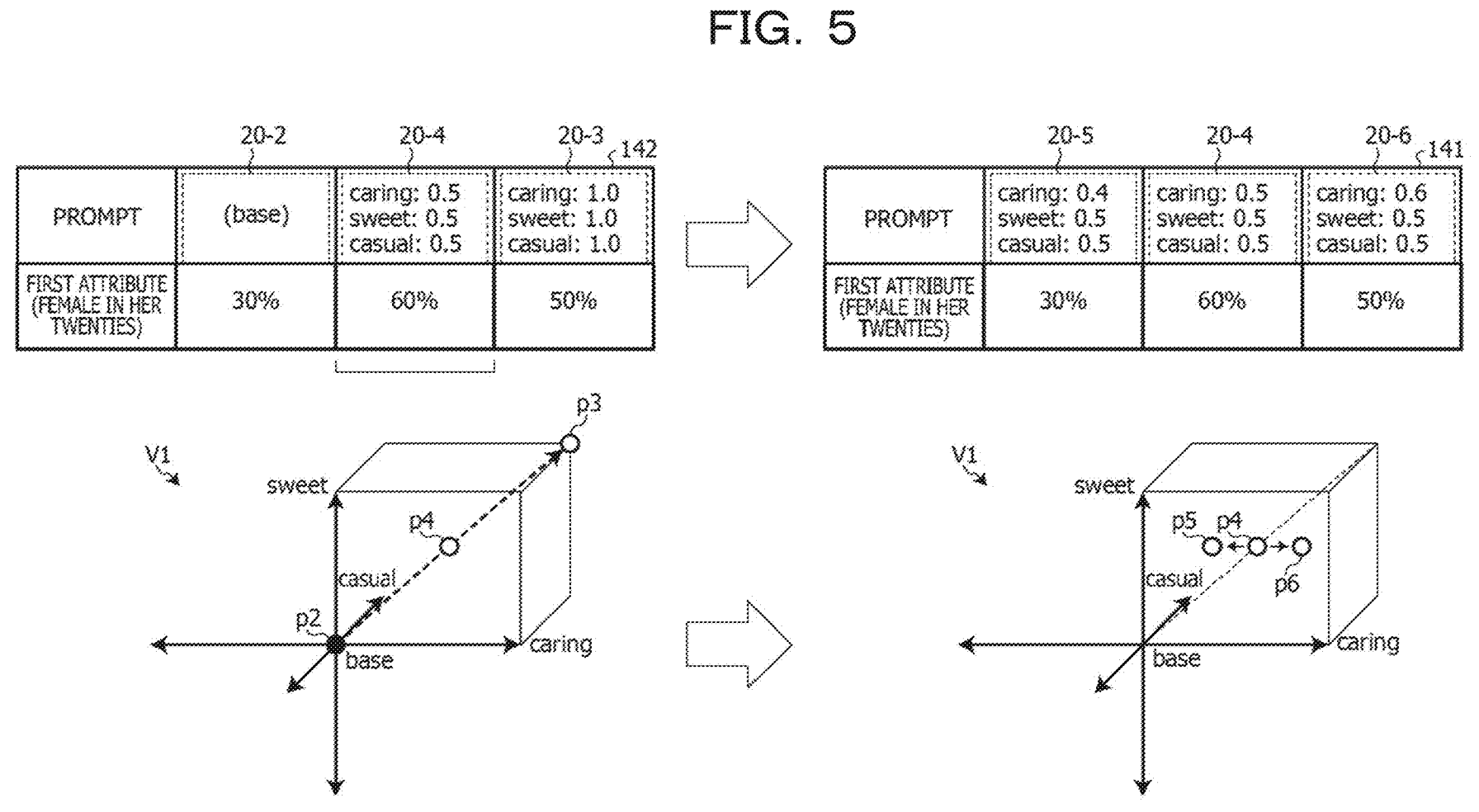

| PROMPT | 20-5 | 20-4 | 20-6 141 |
|---|---|---|---|
| | caring: 0.4<br>sweet: 0.5<br>casual: 0.5 | caring: 0.5<br>sweet: 0.5<br>casual: 0.5 | caring: 0.6<br>sweet: 0.5<br>casual: 0.5 |
| FIRST ATTRIBUTE<br>(FEMALE IN HER<br>TWENTIES) | 30% | 60% | 50% |

| PROMPT | 20-2 | 20-4 | 20-3 142 |
|---|---|---|---|
| | (base) | caring: 0.5<br>sweet: 0.5<br>casual: 0.5 | caring: 1.0<br>sweet: 1.0<br>casual: 1.0 |
| FIRST ATTRIBUTE<br>(FEMALE IN HER<br>TWENTIES) | 30% | 60% | 50% |

| CAMERA IDENTIFICATION INFORMATION | VIDEO DATA |
|---|---|
| C-10a | VIDEO DATA IMAGED BY CAMERA 10a |
| C-10b | VIDEO DATA IMAGED BY CAMERA 10b |
| C-10c | VIDEO DATA IMAGED BY CAMERA 10c |
| C-10d | VIDEO DATA IMAGED BY CAMERA 10d |

FIG. 9

| REFERENCE NUMERAL | JOINT NAME |
|---|---|
| ar0 | SPINE_BASE |
| ar1 | SPINE_MID |
| ar2 | SPINE_SHOULDER |
| ar3 | HEAD |
| ar4 | SHOULDER_LEFT |
| ar5 | ELBOW_LEFT |
| ar6 | WRIST_LEFT |
| ar7 | SHOULDER_RIGHT |
| ar8 | ELBOW_RIGHT |
| ar9 | WRIST_RIGHT |
| ar10 | HIP_LEFT |
| ar11 | KNEE_LEFT |
| ar12 | ANKLE_LEFT |
| ar13 | FOOT_LEFT |
| ar14 | HIP_RIGHT |
| ar15 | KNEE_RIGHT |
| ar16 | ANKLE_RIGHT |
| ar17 | FOOT_RIGHT |
| ar18 | NECK |
| ar19 | HAND_TIP_LEFT |
| ar20 | HAND_TIP_RIGHT |

| CAMERA IDENTIFICATION INFORMATION | CAMERA INSTALLATION POSITION | DISPLAY DEVICE IDENTIFICATION INFORMATION | DISPLAY DEVICE INSTALLATION POSITION |
|---|---|---|---|
| C-10a | INSTALLATION POSITION OF CAMERA 10a | D-15a | INSTALLATION POSITION OF DISPLAY DEVICE 15a |
| C-10b | INSTALLATION POSITION OF CAMERA 10b | D-15b | INSTALLATION POSITION OF DISPLAY DEVICE 15b |
| C-10c | INSTALLATION POSITION OF CAMERA 10c | D-15c | INSTALLATION POSITION OF DISPLAY DEVICE 15c |
| C-10d | INSTALLATION POSITION OF CAMERA 10d | D-15d | INSTALLATION POSITION OF DISPLAY DEVICE 15d |

Figure 11:
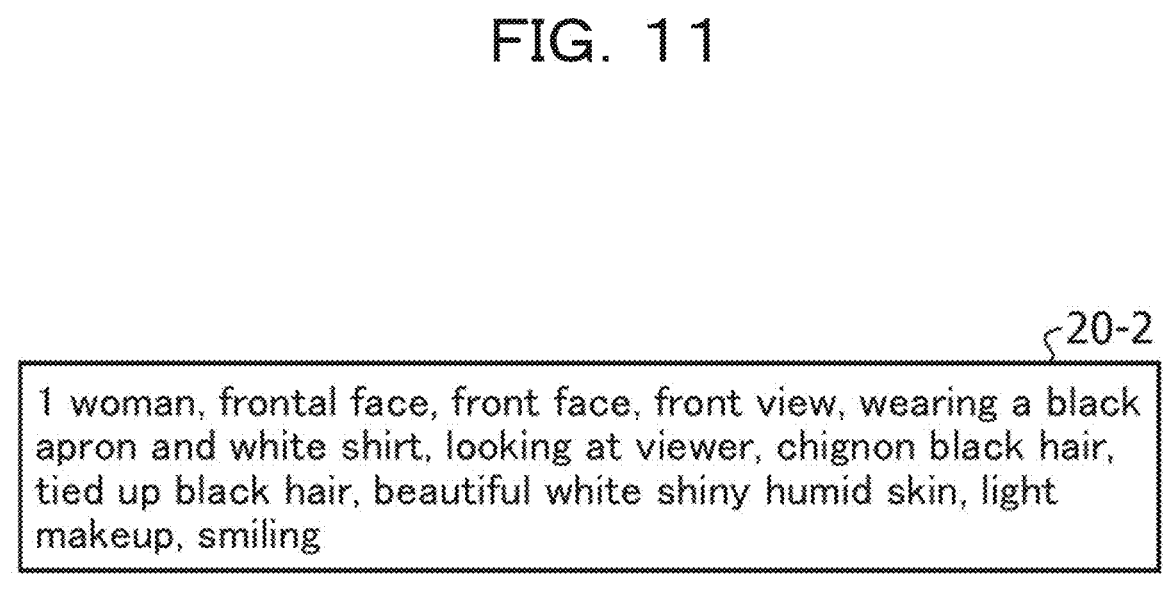

1 woman, frontal face, front face, front view, wearing a black apron and white shirt, looking at viewer, chignon black hair, tied up black hair, beautiful white shiny humid skin, light makeup, smiling

FIG. 16

| PROMPT | cool: 1.0 intelligent: 1.0 posh: 1.0 | (base) | caring: 1.0 sweet: 1.0 casual: 1.0 |
|---|---|---|---|
| CLUSTER cl1 | 33% | 33% | 33% |
| CLUSTER cl2 | 33% | 33% | 33% |
| ... | ... | ... | ... |

| | 20-1 | 20-2 | 20-3 ⌐242 |
|---|---|---|---|
| PROMPT | cool: 1.0<br>intelligent: 1.0<br>posh: 1.0 | (base) | caring: 1.0<br>sweet: 1.0<br>casual: 1.0 |
| CLUSTER cl1 | 15%<br>(15/100) | 60%<br>(60/100) | 25%<br>(25/100) |
| CLUSTER cl2 | 70%<br>(70/100) | 20%<br>(20/100) | 10%<br>(10/100) |
| ... | ... | ... | ... |

FIG. 19

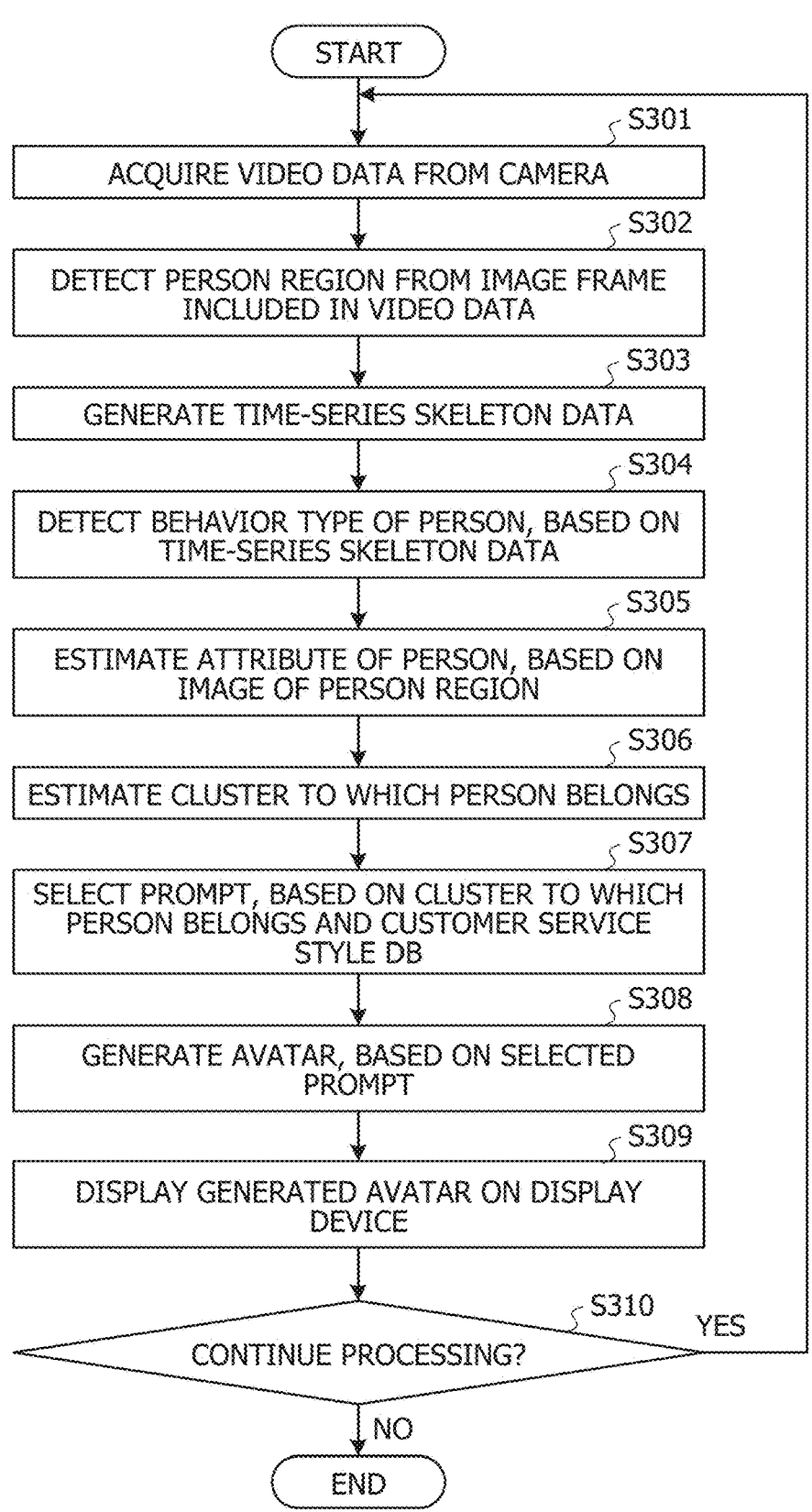

START

S301
ACQUIRE VIDEO DATA FROM CAMERA

S302
DETECT PERSON REGION FROM IMAGE FRAME
INCLUDED IN VIDEO DATA

S303
GENERATE TIME-SERIES SKELETON DATA

S304
DETECT BEHAVIOR TYPE OF PERSON, BASED ON
TIME-SERIES SKELETON DATA

S305
ESTIMATE ATTRIBUTE OF PERSON, BASED ON
IMAGE OF PERSON REGION

S306
ESTIMATE CLUSTER TO WHICH PERSON BELONGS

S307
SELECT PROMPT, BASED ON CLUSTER TO WHICH
PERSON BELONGS AND CUSTOMER SERVICE
STYLE DB

S308
GENERATE AVATAR, BASED ON SELECTED
PROMPT

S309
DISPLAY GENERATED AVATAR ON DISPLAY
DEVICE

S310
CONTINUE PROCESSING?    YES

NO

END

Figure 23:
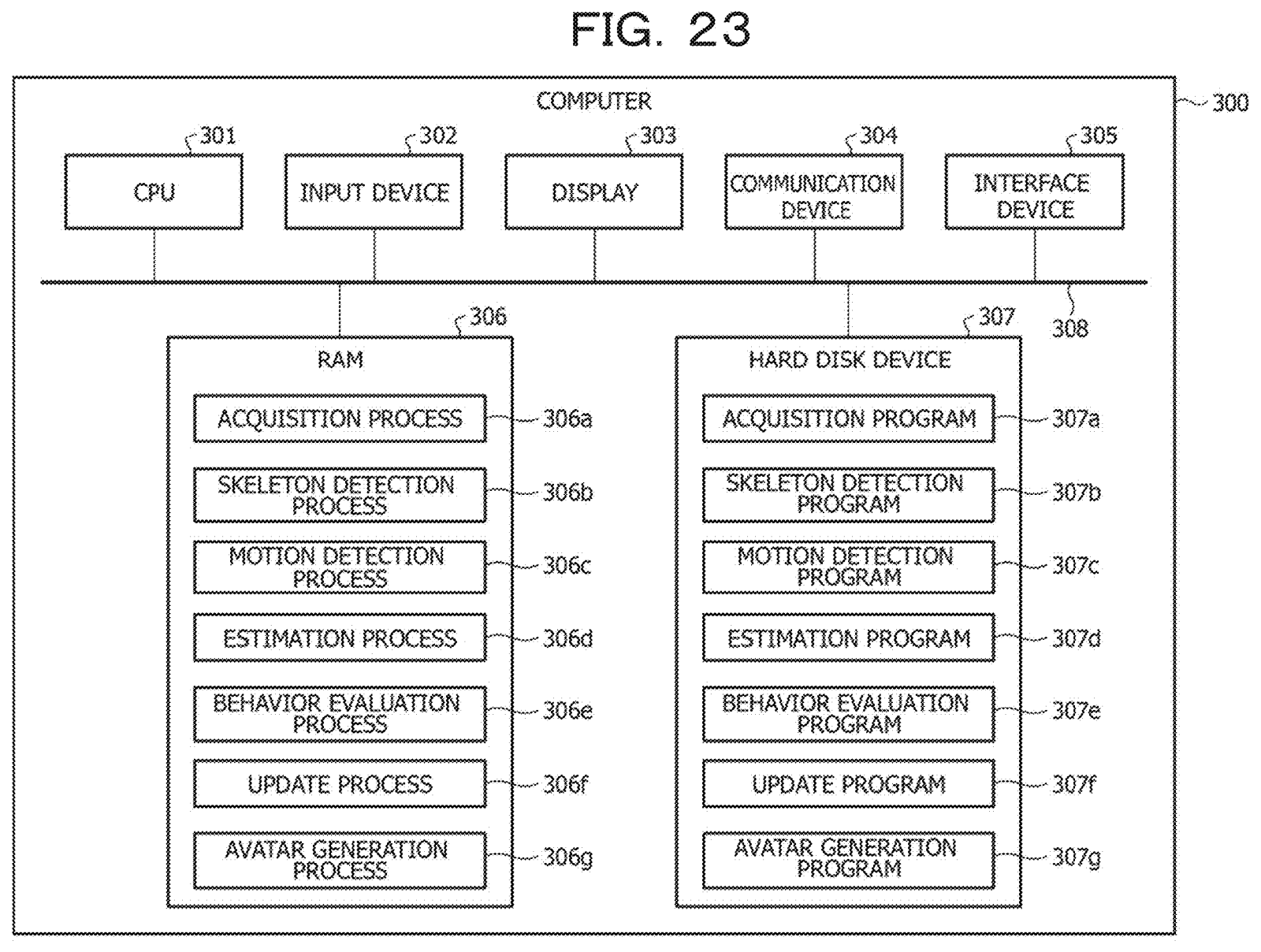

COMPUTER

301 CPU

302 INPUT DEVICE

303 DISPLAY

304 COMMUNICATION DEVICE

305 INTERFACE DEVICE

308

306 RAM

- 306a ACQUISITION PROCESS
- 306b SKELETON DETECTION PROCESS
- 306c MOTION DETECTION PROCESS
- 306d ESTIMATION PROCESS
- 306e BEHAVIOR EVALUATION PROCESS
- 306f UPDATE PROCESS
- 306g AVATAR GENERATION PROCESS

307 HARD DISK DEVICE

- 307a ACQUISITION PROGRAM
- 307b SKELETON DETECTION PROGRAM
- 307c MOTION DETECTION PROGRAM
- 307d ESTIMATION PROGRAM
- 307e BEHAVIOR EVALUATION PROGRAM
- 307f UPDATE PROGRAM
- 307g AVATAR GENERATION PROGRAM

5

(masterpiece: 1.0), (best quality: 1.4), (ultra highres:1.2), (photorealistic: 1.4), (8k, RAW photo: 1.2), (soft focus: 1.4), 1 woman, wearing a black apron, looking at viewer, posh, (sharp focus: 1.4), (korean: 1.2), (american: 1.1), detailed beautifulface, black hair, (detailed open blazer: 1.4), tie, beautiful white shiny humid skin, smiling 5a

COMPUTER-READABLE RECORDING MEDIUM STORING AVATAR GENERATING PROGRAM, AVATAR GENERATING METHOD, AND INFORMATION PROCESSING DEVICE

CROSS-REFERENCE TO RELATED APPLICATION

This application is based upon and claims the benefit of priority of the prior Japanese Patent Application No. 2023-125785, filed on Aug. 1, 2023, the entire contents of which are incorporated herein by reference.

FIELD

The embodiments discussed herein are related to an avatar generating method or the like.

BACKGROUND

In recent years, working population has been decreasing, and a customer service utilizing avatars has been performed. Furthermore, related to generative artificial intelligence (AI), there is related art for generating an image of the avatar used for the customer service, by designating a prompt indicating a feature of the avatar.

FIG. 24 is a diagram illustrating an example of the prompt. As illustrated in FIG. 24, a keyword indicating the feature of the avatar and a weight of the keyword are included in a prompt 5. For example, in the prompt 5, the weight of the keyword is set by a numerical value in parentheses. By designating the prompt 5 for the generative AI by a user, an image 5a of the avatar is generated. By changing the keyword or the weight of the prompt 5, an image different from the image 5a of the avatar is generated.

For example, since it is possible to promote sales of products by setting an optimal avatar and making the avatar provide a customer service to various customers, it is requested to set the optimal avatar for various customers.

Japanese Laid-open Patent Publication No. 2023-94868 and Rombach, R, Blattmann, A., Lorenz, D., Esser, P., & Ommer, B. (2022). *High-resolution image synthesis with latent diffusion models. In Proceedings of the IEEE/CVF Conference on Computer Vision and Pattern Recognition* (pp. 10684-10695). are disclosed as related art.

SUMMARY

According to an aspect of the embodiments, a non-transitory computer-readable recording medium storing an avatar generating program for causing a computer to execute processing includes: acquiring a video obtained by imaging an area that includes a product shelf on which a product is arranged; specifying a behavior of a person and a feature regarding the person by analyzing the acquired video; classifying the specified feature based on a predetermined condition; acquiring a customer service style that is expressed by an avatar displayed in a visually recognizable manner for each person and that is for the product; calculating an occurrence rate of a behavior related to purchase of the product, for each classified feature, based on the specified behavior, for the customer service style; and updating the customer service style, for each classified feature, based on the occurrence rate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an example of a system according to a first embodiment;

FIG. 2 is a diagram illustrating an example of a data structure of a customer service style database (DB) according to the first embodiment;

FIG. 3 is a diagram illustrating an example of a data structure of an occurrence rate DB according to the first embodiment;

FIG. 5 is a diagram for explaining second update processing according to the first embodiment;

FIG. 7 is a diagram illustrating an example of a data structure of an imaging DB;

FIG. 9 is a diagram illustrating an example of a joint name;

FIG. 10 is a diagram illustrating an example of a data structure of a management DB;

FIG. 11 is a diagram illustrating an example of a prompt of a base portion;

FIG. 16 is a diagram illustrating an example of a data structure of a customer service style DB according to the second embodiment;

FIG. 17 is a diagram illustrating an example of a data structure of an occurrence rate DB according to the second embodiment;

FIG. 19 is a flowchart illustrating a processing procedure of presentation processing according to the second embodiment;

FIG. 23 is a diagram illustrating an example of a hardware configuration of a computer that implements functions similar to those of an information processing device according to the embodiment.

DESCRIPTION OF EMBODIMENTS

Figure 4:
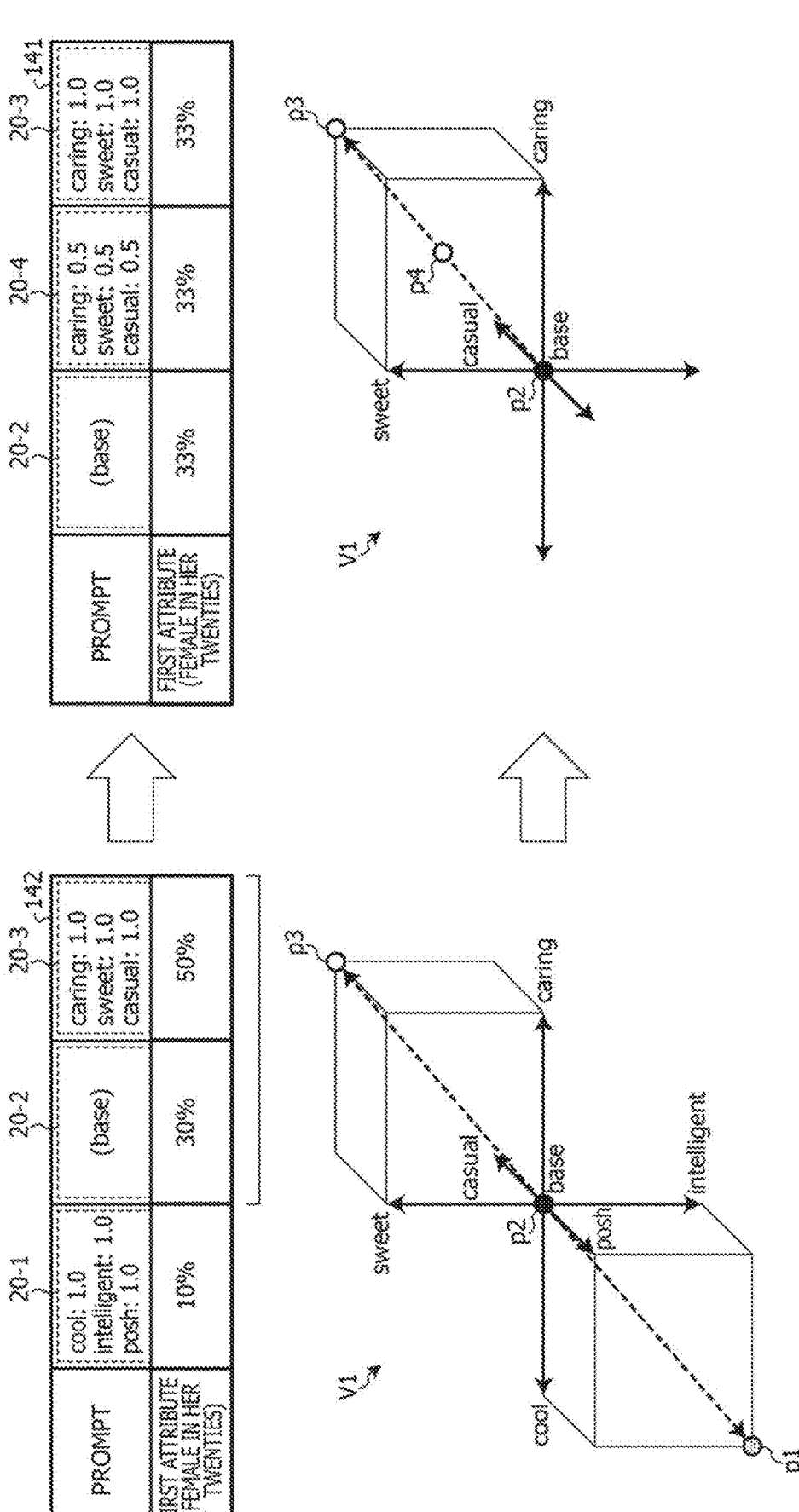
FIG. 4 is a diagram for explaining first update processing according to the first embodiment.

With the related art described above, there is a case where an avatar set to a customer having different personal characteristics such as age, gender, or personality is not optimal, and there is room for improvement of effectiveness of sales measures.

Note that a method is considered for analyzing a reaction of a customer when a customer service is provided using various types of avatars and setting the optimal avatar. However, with such a method, the number of combinations of parameters including the keyword and the weight in the prompt becomes enormous. Therefore, it is not realistic to specify an optimal prompt from such combinations.

In one aspect, an object of the embodiments is to provide an avatar generating program, an avatar generating method, and an information processing device that can set an avatar effective for sales measures.

Hereinafter, embodiments of an avatar generating program, an avatar generating method, and an information processing device disclosed in the present application will be described in detail with reference to the drawings. Note that these embodiments do not limit the present disclosure.

First Embodiment

An example of a system according to a first embodiment will be described. FIG. 1 is a diagram illustrating an example of the system according to the first embodiment. As illustrated in FIG. 1, this system includes cameras 10a, 10b, 10c, and 10d, display devices 15a, 15b, 15c, and 15d, and an information processing device 100. The cameras 10a to 10d, the display devices 15a to 15d, and the information processing device 100 are coupled to each other via a network.

In FIG. 1, for convenience of description, only the cameras 10a to 10d and the display devices 15a to 15d are illustrated. However, the system according to the first embodiment may further include other cameras and other display devices.

The cameras 10a to 10d are installed at predetermined positions in a store. A plurality of products is arranged in the store. Positions (coordinates) where the cameras 10a to 10d are installed are set as positions different from each other. In the following description, in a case where the cameras 10a to 10d are not particularly distinguished, the cameras 10a to 10d are referred to as a "camera 10".

The camera 10 images a video in the store and transmits data of the imaged video to the information processing device 100. It is assumed that product shelves and the display devices 15a to 15d be respectively included in imaging ranges of the cameras 10a to 10d. In the following description, the data of the video transmitted from the camera 10 to the information processing device 100 is referred to as "video data".

The video data includes a plurality of time-series image frames. Frame numbers are assigned to the respective image frames in an ascending order of time series. One image frame is a still image imaged by the camera 10 at a certain timing. Time data may be added to each image frame. Camera identification information used to identify the camera 10 that has imaged the video data is set to the video data.

The display devices 15a to 15d are installed at predetermined positions in the store. The display device is a device that displays various types of information, based on information received from the information processing device 100. The display devices 15a to 15d are digital signages or the like. For example, the display devices 15a to 15d display an image of an avatar generated by the information processing device 100. In the following description, in a case where the display devices 15a to 15d are not particularly distinguished, the display devices 15a to 15d are referred to as a "display device 15".

The information processing device 100 is a device that generates an avatar corresponding to an attribute of a customer and displays the generated avatar on the display device 15. For example, the information processing device 100 executes presentation processing and update processing.

First, the presentation processing executed by the information processing device 100 will be described. The information processing device 100 displays avatars of a plurality of customer service styles (image of avatar) on the display device 15, based on a customer service style DB 141. For example, the customer service style is a prompt expressed as a keyword or a weight of the keyword. The keyword and the weight included in the prompt is an example of a "parameter".

FIG. 2 is a diagram illustrating an example of a data structure of the customer service style DB according to the first embodiment. As illustrated in FIG. 2, the customer service style DB 141 associates the attribute of the customer, the prompt, and a presentation ratio of a customer service style (prompt) to be presented to the customer. In the first embodiment, as an example, the attribute of the customer is a set of age and gender of the customer. The rate of the customer service style (prompt) to be presented to the customer is referred to as a "presentation ratio".

In FIG. 2, as initial values of the prompts, prompts 20-1, 20-2, and 20-3 are set. For example, the prompt 20-1 includes "cool: 1.0, intelligent: 1.0, posh: 1.0". The prompt 20-2 is a prompt to be a "base (base)". The prompt to be the base is a prompt that does not depend on the customer service style. The prompt 20-3 includes "caring: 1.0, sweet: 1.0, casual: 1.0". Each prompt of the customer service style DB 141 is updated by the update processing to be described later.

In FIG. 2, a presentation ratio at which an avatar of the prompt 20-1 is presented to a customer with a first attribute (female in her twenties) is "33%". A presentation ratio at which an avatar of the prompt 20-2 is presented to the customer with the first attribute is "33%". A presentation ratio at which an avatar of the prompt 20-3 is presented to the customer with the first attribute is "33%".

A presentation ratio at which the avatar of the prompt 20-1 is presented to a customer with a second attribute (male in his forties) is "33%". A presentation ratio at which the avatar of the prompt 20-2 is presented to the customer with the second attribute is "33%". A presentation ratio at which the avatar of the prompt 20-3 is presented to the customer with the second attribute is "33%".

For example, the information processing device 100 specifies the attribute of the customer, by analyzing video data of the camera 10a. In a case where the attribute of the customer is the first attribute (female in her twenties), the prompt is selected, based on the presentation ratio corresponding to the first attribute of the customer service style DB 141, and an image of an avatar based on the selected prompt is displayed on the display device 15a.

Returning to the description in FIG. 1, the update processing executed by the information processing device 100 will be described. The information processing device 100 calculates an occurrence rate of a predetermined purchase behavior of the customer for the avatar of each customer service style (prompt), for each attribute of the customer, by analyzing the video data of the camera 10 and registers the occurrence rate in an occurrence rate DB 142. The information processing device 100 updates the customer service style (prompt) for each attribute of the customer registered in the customer service style DB 141, based on the occurrence rate for each customer service style and for each attribute of the customer, registered in the occurrence rate DB 142. In the first embodiment, as an example, the predetermined purchase behavior of the customer is set as a "stopping behavior" of the customer in front of the product shelf.

FIG. 3 is a diagram illustrating an example of a data structure of the occurrence rate DB according to the first embodiment. As illustrated in FIG. 3, the occurrence rate DB 142 associates the plurality of attributes, the plurality of prompts, and the occurrence rate of the stopping behavior. In FIG. 3, as the initial values of the prompts, the prompts 20-1 to 20-3 are set. Description regarding the prompts 20-1 to 20-3 is similar to that described in FIG. 2.

In FIG. 3, a rate (occurrence rate) at which the customer with the first attribute (female in her twenties) performs the stopping behavior due to display of the avatar of the prompt 20-1 is "15%". A rate at which the customer with the first attribute performs the stopping behavior due to display of the avatar of the prompt 20-2 is "60%". A rate at which the customer with the first attribute performs the stopping behavior due to display of the avatar of the prompt 20-3 is "25%".

A rate at which the customer with the second attribute (male in his forties) performs the stopping behavior due to the display of the avatar of the prompt 20-1 is "70%". A rate at which the customer with the second attribute performs the stopping behavior due to the display of the avatar of the prompt 20-2 is "20%". A rate at which the customer with the second attribute performs the stopping behavior due to display of the avatar of the prompt 20-3 is "10%".

Here, first update processing and second update processing executed by the information processing device 100 will be described in order. First, the first update processing will be described. FIG. 4 is a diagram for explaining the first update processing according to the first embodiment.

In FIG. 4, the description will be made by using the occurrence rate of each stopping behavior of the first attribute (female in her twenties) in the occurrence rate DB 142. In FIG. 4, for convenience of description, description will be made as assuming that the occurrence rates of the prompts 20-1 to 20-3 for the first attribute are respectively 10%, 30%, and 50%.

For example, a position of the prompt 20-1 is a position p1, in a feature space V1 of the prompt. A position of the prompt 20-2 is a position p2, in the feature space V1 of the prompt. A position of the prompt 20-3 is a position p3, in feature space V1 of the prompt.

The information processing device 100 scans each occurrence rate of the first attribute in the occurrence rate DB 142 and determines whether or not there is a significant difference in the occurrence rate between the respective prompts. For example, the information processing device 100 sets a threshold (for example, 20%) in advance and compares the threshold with other occurrence rate, and then determines that there is a significant difference in the occurrence rate in a case where there is a prompt with a higher occurrence rate that is equal to or more than the threshold.

In the example illustrated in FIG. 4, the occurrence rate "30%" of the prompt 20-2 is equal to or more than the threshold, as compared with the occurrence rate "10%" of the prompt 20-1. Furthermore, the occurrence rate "50%" of the prompt 20-3 is equal to or more than the threshold, as compared with the occurrence rate "10%" of the prompt 20-1. Therefore, in the example illustrated in FIG. 4, the information processing device 100 determines that there is the significant difference in the occurrence rate.

In a case of determining that there is the significant difference in the occurrence rate, in the first update processing, the information processing device 100 selects a prompt with a largest occurrence rate and a prompt with a second largest occurrence rate and searches for a midpoint of the selected prompts.

In the example illustrated in FIG. 4, the information processing device 100 selects the prompt 20-3 with the largest occurrence rate and the prompt 20-2 with the second largest occurrence rate. In the feature space V1, the information processing device 100 searches for a position p4 corresponding to a midpoint of the position p3 of the prompt 20-3 and the position p2 of the prompt 20-2. A prompt corresponding to the position p4 is "caring: 0.5, sweet: 0.5, casual: 0.5".

The information processing device 100 updates a prompt corresponding to the first attribute registered in the customer service style DB 141, based on the above calculation result. Specifically, the information processing device 100 updates the prompt corresponding to the first attribute to prompts 20-2, 20-4, and 20-3. To the prompt 20-4, a value corresponding to the position p4 searched in FIG. 4 is set.

Subsequently, the second update processing will be described. FIG. 5 is a diagram for explaining the second update processing according to the first embodiment. In FIG. 5, the description will be made by using the occurrence rate of each stopping behavior of the first attribute (female in her twenties) in the occurrence rate DB 142. In FIG. 5, for convenience of description, description will be made as assuming that the occurrence rates of the prompts 20-2, 20-4, and 20-3 for the first attribute are respectively 30%, 60%, and 50%.

For example, the position of the prompt 20-2 is the position p2, in the feature space V1 of the prompt. The position of the prompt 20-4 is the position p4, in the feature space V1 of the prompt. The position of the prompt 20-3 is the position p3, in the feature space V1 of the prompt.

The information processing device 100 scans each occurrence rate of the first attribute in the occurrence rate DB 142 and determines whether or not there is a significant difference in the occurrence rate between the respective prompts. For example, the information processing device 100 sets a threshold (for example, 20%) in advance and compares the threshold with other occurrence rate, and then determines that there is a significant difference in the occurrence rate in a case where there is a prompt with a higher occurrence rate that is equal to or more than the threshold.

In the example illustrated in FIG. 5, the occurrence rate "60%" of the prompt 20-4 is equal to or more than the threshold, as compared with the occurrence rate "30%" of the prompt 20-2. Furthermore, the occurrence rate "50%" of the prompt 20-3 is equal to or more than the threshold, as compared with the occurrence rate "30%" of the prompt 20-1. Therefore, in the example illustrated in FIG. 5, the information processing device 100 determines that there is a significant difference in the occurrence rate.

In a case of determining that there is the significant difference in the occurrence rate, in the second update processing, the information processing device 100 selects a prompt with a largest occurrence rate and searches around the selected prompt.

In the example illustrated in FIG. 5, the information processing device 100 selects the prompt 20-4 with the largest occurrence rate. The information processing device 100 generates other prompts, by changing a weight of any one of a plurality of keywords included in the selected prompt 20-4. For example, by changing "caring: 0.5" of the prompt 20-4 to "caring: 0.4", the information processing device 100 generates a prompt 20-5. The information processing device 100 generates the prompt 20-6, by changing "caring: 0.5" of the prompt 20-4 to "caring: 0.6". A position of the prompt 20-5 in the feature space V1 is a position p5. A position of a prompt 20-6 in the feature space V1 is a position p6. In FIG. 5, the information processing device 100 selects the keyword "caring" and changes the weight. However, the information processing device 100 may select weights of other keywords "sweet" and "casual". The information processing device 100 may randomly select keywords to be a weight change target.

The information processing device 100 updates a prompt corresponding to the first attribute registered in the customer service style DB 141, based on the above calculation result. Specifically, the information processing device 100 updates the prompt corresponding to the first attribute to the prompts 20-5, 20-4, and 20-6.

The information processing device 100 repeatedly executes the first update processing and the second update processing described above, until the significant difference in the occurrence rate between the respective prompts is eliminated. Note that the information processing device 100 may repeatedly execute the first update processing and the second update processing only a preset number of times.

Furthermore, in the above description, a case has been described where the information processing device 100 updates the prompt for the first attribute. However, update of prompts corresponding to other attributes is similarly performed.

As described above, the information processing device 100 according to the first embodiment calculates the occurrence rate of the predetermined purchase behavior of the customer for the avatar of each customer service style (prompt), for each attribute of the customer, by analyzing the video data of the camera 10 and registers the occurrence rate in the occurrence rate DB 142. The information processing device 100 updates the customer service style (prompt) for each attribute of the customer registered in the customer service style DB 141, based on the occurrence rate for each customer service style and for each attribute of the customer, registered in the occurrence rate DB 142. This makes it possible to set an avatar effective for sales measures.

Figure 6:
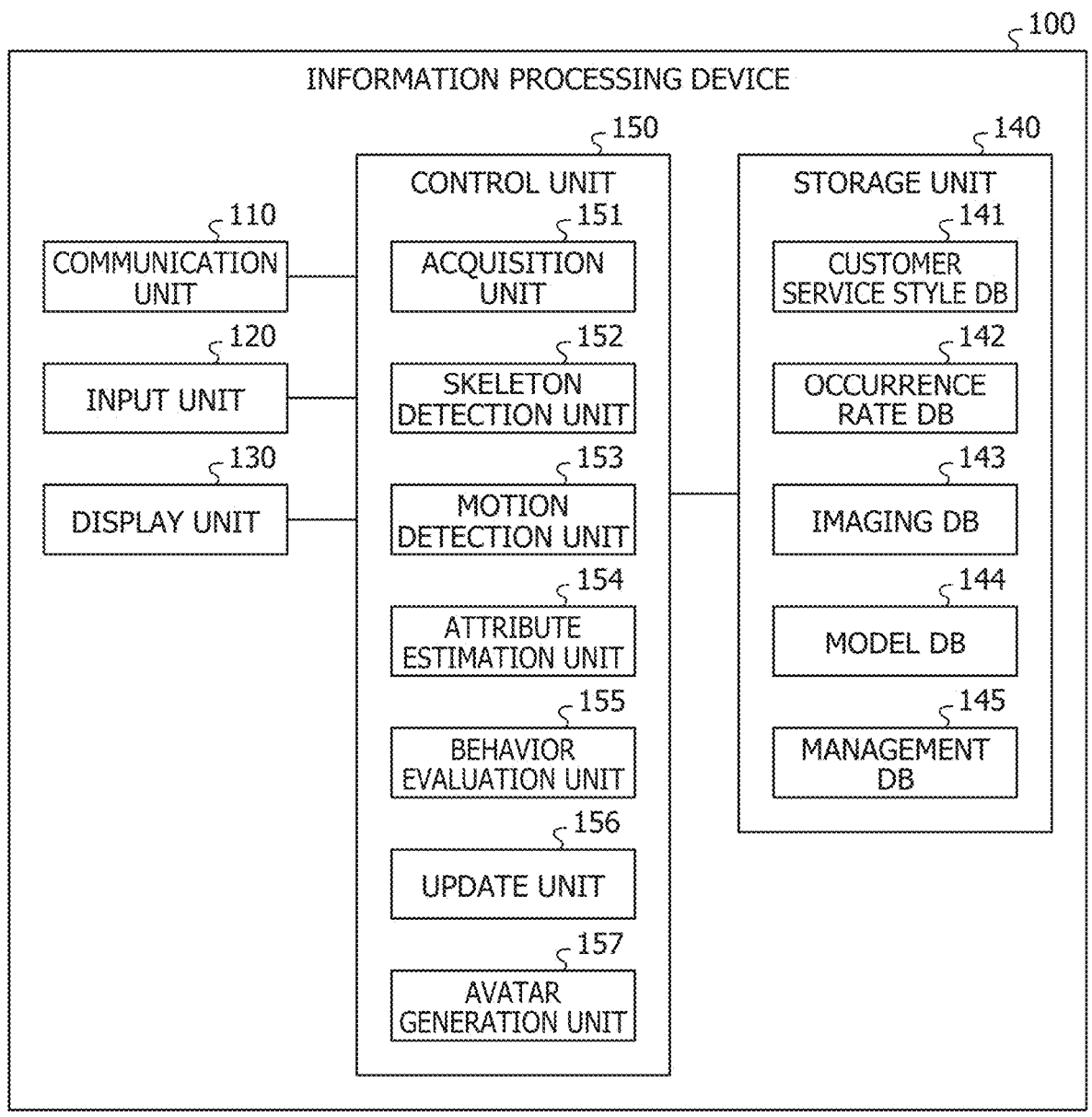
FIG. 6 is a functional block diagram illustrating a configuration of an information processing device according to the first embodiment.

Next, a configuration example of the information processing device 100 that executes the above processing will be described. FIG. 6 is a functional block diagram illustrating a configuration of the information processing device according to the first embodiment. As illustrated in FIG. 6, the information processing device 100 includes a communication unit 110, an input unit 120, a display unit 130, a storage unit 140, and a control unit 150.

The communication unit 110 performs data communication with the camera 10, the display device 15, an external device, or the like, via a network. The communication unit 110 is a network interface card (NIC) or the like. For example, the communication unit 110 receives the video data from the camera 10.

The input unit 120 is an input device that inputs various types of information to the control unit 150 of the information processing device 100.

The display unit 130 is a display device that displays information output from the control unit 150.

The storage unit 140 includes the customer service style DB 141, the occurrence rate DB 142, an imaging DB 143, a model DB 144, and a management DB 145. The storage unit 140 is a storage device such as a memory.

The customer service style DB 141 associates the attribute of the customer, the prompt, and the presentation ratio of the customer service style (prompt) to be presented to the customer. Other description of the customer service style DB 141 is similar to the description made regarding the customer service style DB 141 described with reference to FIG. 2.

The occurrence rate DB 142 associates the plurality of attributes, the plurality of prompts, and the occurrence rate of the stopping behavior. Other description regarding the occurrence rate DB 142 is similar to the description regarding the occurrence rate DB 142 described with reference to FIG. 3.

The imaging DB 143 holds the video data imaged by the camera 10. FIG. 7 is a diagram illustrating an example of a data structure of the imaging DB. As illustrated in FIG. 7, the imaging DB 143 associates camera identification information with video data. The camera identification information is information used to uniquely identify the camera 10. For example, pieces of camera identification information C-10*a*, C-10*b*, C-10*c*, and C-10*d* respectively correspond to the cameras 10*a*, 10*b*, 10*c*, and 10*d*. The video data is the video data imaged by the corresponding camera 10.

The model DB 144 includes a plurality of machine learning models used by the control unit 150. For example, the model DB 144 includes a first machine learning model, a second machine learning model, and a third machine learning model. The first machine learning model, the second machine learning model, and the third machine learning model are trained machine learning models and neural networks (NN) or the like.

Figure 8:
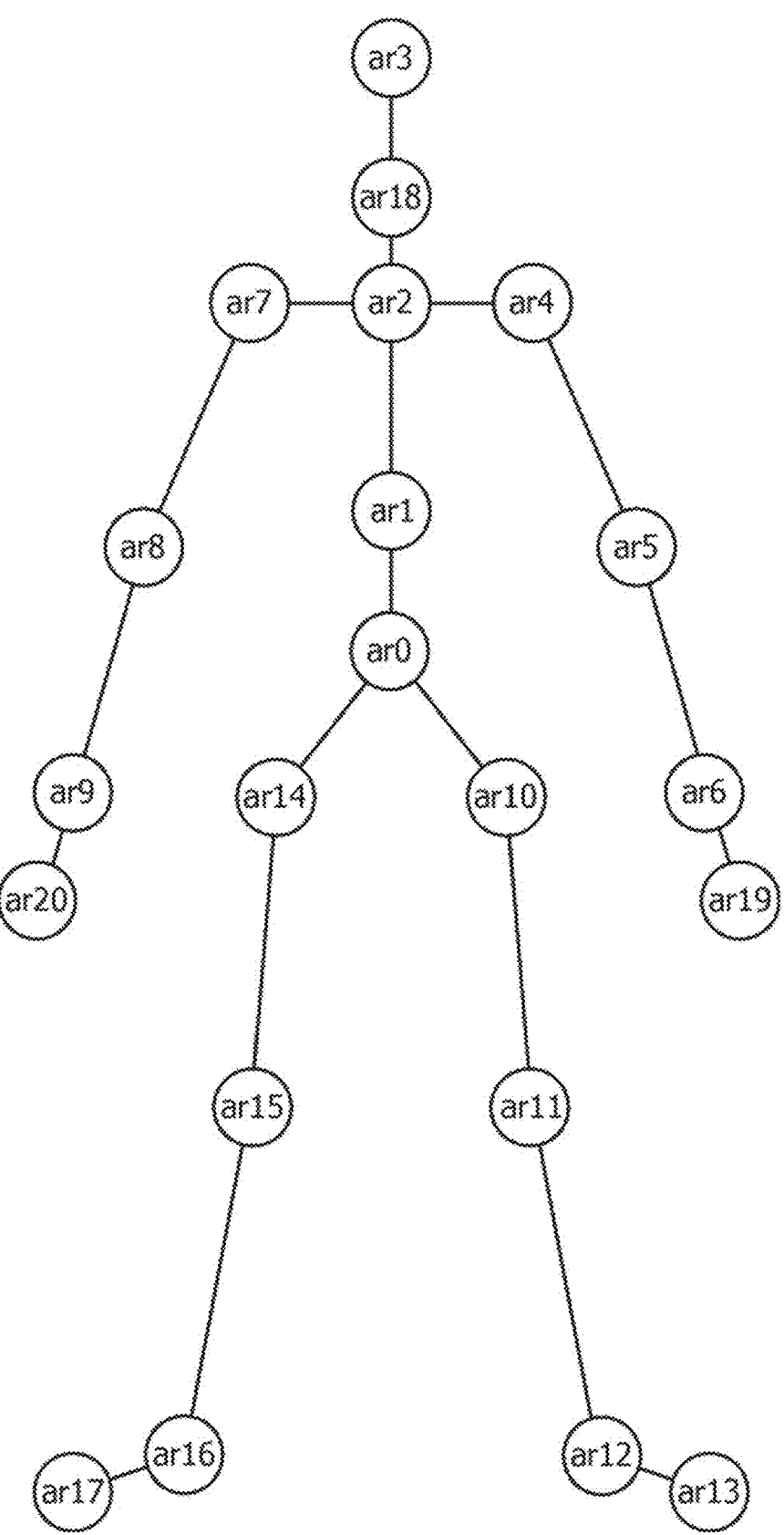
FIG. 8 is a diagram illustrating an example of a skeleton model of a human body.

The first machine learning model is a model that outputs skeleton data of a person, in a case where an image of the person is input. The skeleton data is data in which two-dimensional or three-dimensional coordinates are set to a plurality of joints defined by a skeleton model of a human body. FIG. 8 is a diagram illustrating an example of the skeleton model of the human body. For example, as illustrated in FIG. 8, the skeleton model of the human body is defined by 21 joints ar0 to ar20.

A relationship between each of the joints ar0 to ar20 illustrated in FIG. 8 and a joint name is as illustrated in FIG. 9. FIG. 9 is a diagram illustrating an example of the joint name. For example, the joint name of the joint ar0 is "SPINE_BASE". The joint names of the joints ar0 to a20 are as illustrated in FIG. 9, and description thereof is omitted.

The second machine learning model is a model that outputs a behavior type of the person, in a case where time-series skeleton data is input. For example, the behavior type of the person includes "walking", "stopping", "viewing product shelf", "viewing product", "stretching hand to product", or the like.

The third machine learning model is a model that outputs an attribute (age, gender) of the person, in a case where an image of the person is input. Note that the third machine learning model may output other attributes, as the attribute of the person. The other attributes include an age, clothes, or the like of the person.

The management DB 145 holds various types of information regarding the camera 10 and the display device 15. FIG. 10 is a diagram illustrating an example of a data structure of the management DB. As illustrated in FIG. 10, the management DB 145 associates camera identification information, a camera installation position, display device identification information, and a display device installation position.

The camera identification information is similar to the above description. The camera installation position indicates a position (coordinates) where the camera 10 is installed. The display device identification information is information used to uniquely identify the display device 15. Pieces of display device identification information D-15a, D-15b, D-15c, and D-15d respectively correspond to the display devices 15a, 15b, 15c, and 15d. The display device installation position indicates a position where the display device 15 is installed. Furthermore, a display device of display device identification information included in the same record as camera identification information of a certain camera means that the display device is included in an imaging range of the camera.

Subsequently, the description proceeds to description of the control unit 150. The control unit 150 includes an acquisition unit 151, a skeleton detection unit 152, a motion detection unit 153, an attribute estimation unit 154, a behavior evaluation unit 155, an update unit 156, and an avatar generation unit 157. The control unit 150 is a central processing unit (CPU), a graphics processing unit (GPU), or the like.

The acquisition unit 151 acquires the video data from the camera 10. The acquisition unit 151 stores the acquired video data in the imaging DB 143, in association with the camera identification information of the camera.

The skeleton detection unit 152 acquires the video data from the imaging DB 143 and detects each person region (BoundingBox) from the time-series image frames included in the video data. The skeleton detection unit 152 generates the time-series skeleton data by inputting images of the time-series person regions detected from the time-series image frames into the first machine learning model. The skeleton detection unit 152 outputs the time-series skeleton data to the motion detection unit 153. It is assumed that the skeleton detection unit 152 set the camera identification information of the camera 10 that has imaged the video data to be a generation source of the skeleton data, to the skeleton data.

The motion detection unit 153 divides the time-series skeleton data for each predetermined period and inputs the time-series skeleton data in the predetermined period into the second machine learning model, so as to detect a behavior type of the person in the predetermined period. By repeatedly executing the above processing for each predetermined period, the motion detection unit 153 outputs the behavior type of the person for each predetermined period to the behavior evaluation unit 155. It is assumed that the motion detection unit 153 set the camera identification information set to the skeleton data, to the behavior type of the person.

The attribute estimation unit 154 detects each person region (BoundingBox) from the time-series image frames included in the video data. The attribute estimation unit 154 estimates the attribute of the person, by inputting the image of the person region into the third machine learning model. The attribute estimation unit 154 outputs the attribute of the person to be an estimation result, to the behavior evaluation unit 155 and the avatar generation unit 157. It is assumed that the attribute estimation unit 154 set a person ID, the camera identification information of the camera 10 that has imaged the video data, and time data of the image frame, to information regarding the attribute of the person. The attribute estimation unit 154 sets the same person ID, to the attribute of the same person, by performing tracking or the like on the time-series image frames.

The avatar generation unit 157 selects the prompt based on the attribute of the person acquired from the attribute estimation unit 154 and the customer service style DB 141. The avatar generation unit 157 generates the image of the avatar based on the selected prompt and displays the generated image of the avatar on the display device 15. Processing of the avatar generation unit 157 corresponds to the presentation processing described above.

In a case where the attribute of the person is the first attribute (female in her twenties), the avatar generation unit 157 selects the prompt, based on the presentation ratio set to the record of the first attribute in the customer service style DB 141 (FIG. 2). Furthermore, the avatar generation unit 157 specifies the display device that displays the image of the avatar, based on the camera identification information set to the attribute of the person acquired from the attribute estimation unit 154 and the management DB 145. In a case where the camera identification information is "C-10a", the image of the avatar is displayed on the display device 15a of display device identification information "D-15a".

Note that, when displaying the image of the avatar on the display device 15, the avatar generation unit 157 outputs display history information in which information regarding the prompt to be a generation source of the image of the avatar, a time when the image of the avatar is displayed, and the display device identification information of the display device 15 that displays the image of the avatar are associated with each other, to the behavior evaluation unit 155.

The behavior evaluation unit 155 updates the occurrence rate DB 142, based on the display history information, the behavior type of the person for each predetermined period acquired from the motion detection unit 153, and the attribute of the person acquired from the attribute estimation unit 154.

For example, the behavior evaluation unit 155 associates the attribute of the person, information regarding a prompt referred by the person, and the behavior type of the person, for each person, based on the display history information described above, the behavior type of the person for each predetermined period, and the information regarding the attribute of the person. The behavior evaluation unit 155 specifies the number of detected persons and the number of persons who has performed the stopping behavior, for each attribute of the person and each prompt, and calculates an occurrence rate of the stopping behavior. The behavior evaluation unit 155 updates the occurrence rate DB 142, based on the calculation result.

The update unit 156 updates the prompt of the customer service style DB 141, by executing the first update processing and the second update processing. The first update processing executed by the update unit 156 is similar to the update processing described with reference to FIG. 4. The second update processing executed by the update unit 156 is similar to the update processing described with reference to FIG. 5. The update unit 156 repeatedly executes the first update processing and the second update processing, until the significant difference in the occurrence rate between the respective prompts is eliminated. Note that the update unit 156 may repeatedly execute the first update processing and the second update processing only a preset number of times.

Note that the update unit 156 may set an initial value of the prompt of the customer service style DB 141 in any way. For example, the update unit 156 acquires a prompt of a base that does not depend on the customer service style from a prompt DB (not illustrated) and sets the prompt to the customer service style DB 141.

FIG. 11 is a diagram illustrating an example of a prompt of a base portion. The prompt 20-2 illustrated in FIG. 11 corresponds to the prompt 20-2 illustrated in FIG. 2. Furthermore, the update unit 156 generates keywords "cool", "intelligent", and "well educated" according to a customer service style "intelligent and calm customer service", using dictionary data and sets an initial value "1.0" of a weight of each keyword so as to generate the prompt 20-2 in FIG. 2. The update unit 156 generates keywords "caring", "sweet", and "casual" according to a customer service style "warm customer service", using the dictionary data and sets an initial value "1.0" of the weight of each keyword so as to generate the prompt 20-3 in FIG. 2.

Figure 12:
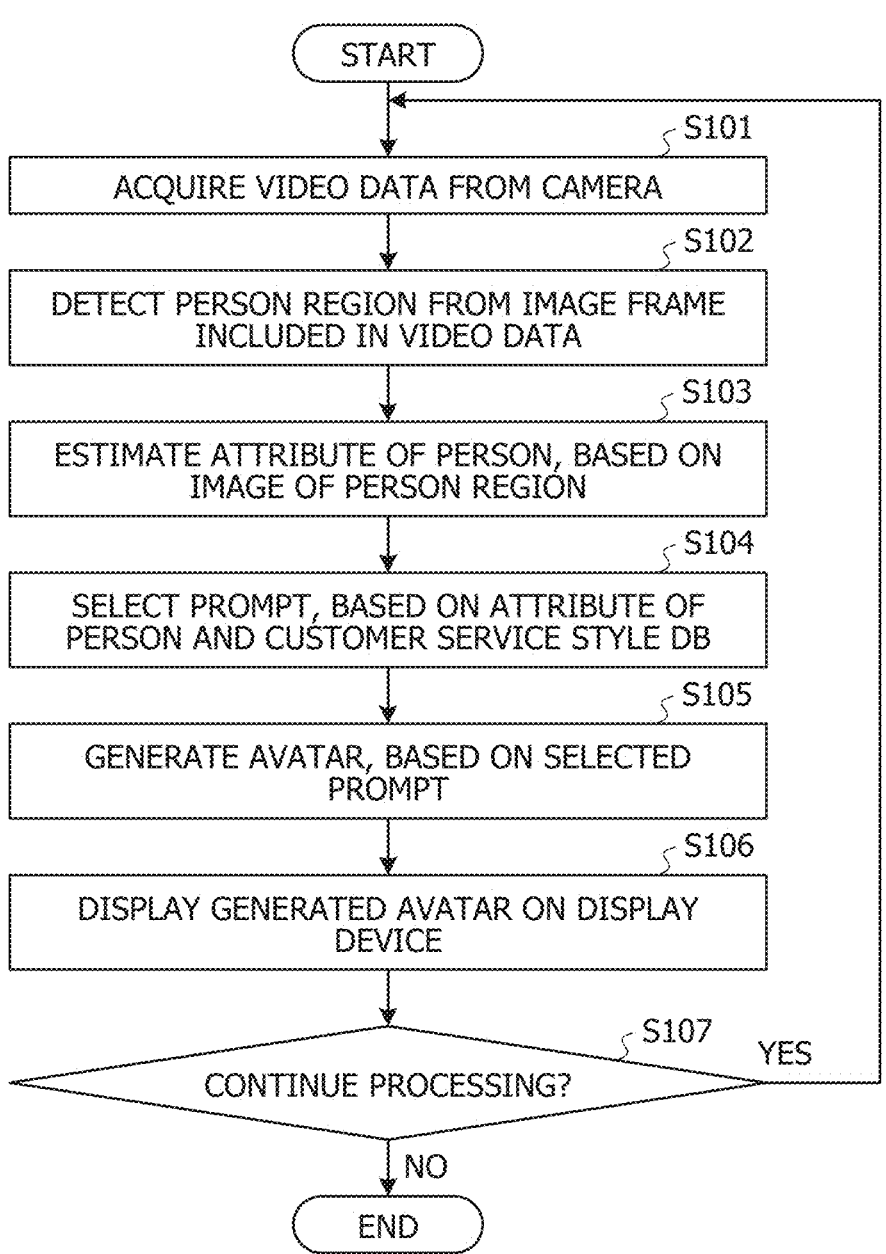
FIG. 12 is a flowchart illustrating a processing procedure of presentation processing according to the first embodiment.

Next, a processing procedure (presentation processing and update processing) of the information processing device 100 according to the first embodiment will be described. FIG. 12 is a flowchart illustrating a processing procedure of the presentation processing according to the first embodiment. As illustrated in FIG. 12, the acquisition unit 151 of the information processing device 100 acquires the video data from the camera 10 (step S101).

The attribute estimation unit 154 of the information processing device 100 detects a person region from image data included in the video data (step S102). The attribute estimation unit 154 estimates the attribute of the person, based on the image of the person region (step S103).

The avatar generation unit 157 of the information processing device 100 selects the prompt, based on the attribute of the person and the customer service style DB 141 (step S104). The avatar generation unit 157 generates the avatar, based on the selected prompt (step S105).

The avatar generation unit 157 displays the generated avatar on the display device 15 (step S106). In a case where processing is continued (step S107, Yes), the information processing device 100 proceeds the procedure to step S101. On the other hand, in a case where the processing is not continued (step S107, No), the information processing device 100 ends the processing.

Figure 13:
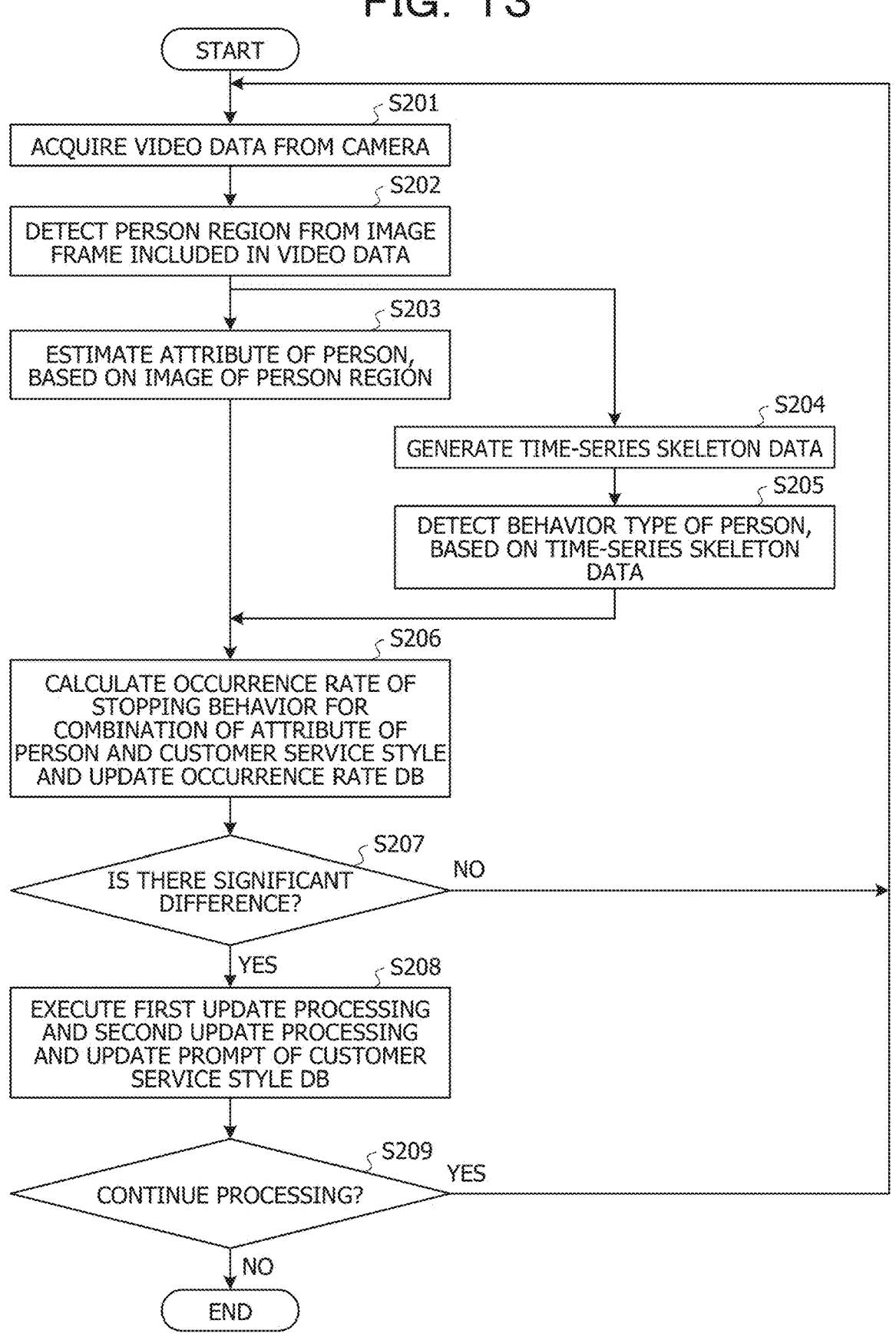
FIG. 13 is a flowchart illustrating a processing procedure of update processing according to the first embodiment.

FIG. 13 is a flowchart illustrating the processing procedure of the update processing. As illustrated in FIG. 13, the acquisition unit 151 of the information processing device 100 acquires the video data from the camera 10 (step S201). The skeleton detection unit 152 and the attribute estimation unit 154 of the information processing device 100 detect the person region from the image data included in the video data (step S202). The attribute estimation unit 154 estimates the attribute of the person, based on the image of the person region (step S203) and proceeds the procedure to step S206.

The skeleton detection unit 152 generates the time-series skeleton data (step S204). The motion detection unit 153 of the information processing device 100 detects the behavior type of the person, based on the time-series skeleton data (step S205).

The behavior evaluation unit 155 of the information processing device 100 calculates the occurrence rate of the stopping behavior, for a combination of the attribute of the person and the customer service style (prompt) and updates the occurrence rate DB 142 (step S206).

In a case where there is no significant difference between the prompts set to the occurrence rate DB 142 (step S207, No), the information processing device 100 proceeds the procedure to step S201. On the other hand, in a case where there is a significant difference between the prompts set to the occurrence rate DB 142 (step S207, Yes), the information processing device 100 proceeds the procedure to step S208.

The update unit 156 of the information processing device 100 executes the first update processing and the second update processing and updates the prompt of the customer service style DB 141 (step S208). In a case where processing is continued (step S209, Yes), the information processing device 100 proceeds the procedure to step S201. On the other hand, in a case where the processing is not continued (step S209, No), the information processing device 100 ends the processing.

Next, effects of the information processing device 100 according to the first embodiment will be described. The information processing device 100 calculates the occurrence rate of the predetermined purchase behavior of the customer for the avatar of each customer service style (prompt), for each attribute of the customer, by analyzing the video data of the camera 10 and registers the occurrence rate in the occurrence rate DB 142. The information processing device 100 updates the customer service style (prompt) for each attribute of the customer registered in the customer service style DB 141, based on the occurrence rate for each customer service style and for each attribute of the customer, registered in the occurrence rate DB 142. This makes it possible to set the avatar effective for sales measures.

The information processing device 100 selects a plurality of customer service styles of which an occurrence rate is larger than other customer service styles, from among a plurality of customer service styles for a certain attribute registered in the occurrence rate DB 142 and updates a parameter of the customer service style for the certain attribute, based on a parameter set to the plurality of selected customer service styles. This makes it possible to bring the parameter of the prompt closer to a parameter more effective for the sales measures.

The information processing device 100 selects a customer service style of which the occurrence rate is the largest, from among the plurality of customer service styles for the certain attribute registered in the occurrence rate DB 142 and updates a customer service style for the certain attribute, based on a parameter set to the selected customer service style. As a result, it is possible to search for the parameter more effective for the sales measures.

Second Embodiment

Figure 14:
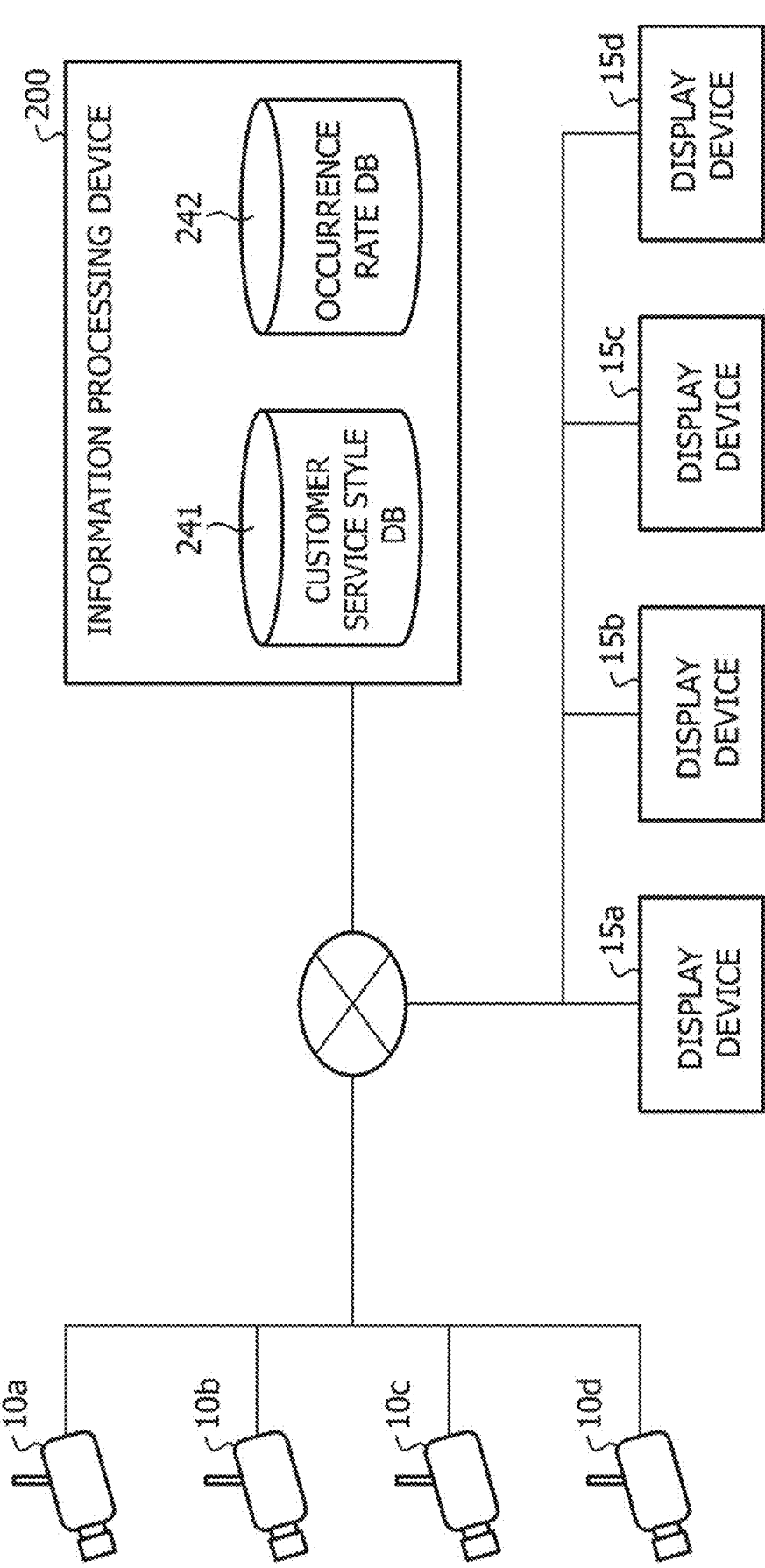
FIG. 14 is a diagram illustrating an example of a system according to a second embodiment.

Next, an example of a system according to a second embodiment will be described. FIG. 14 is a diagram illustrating an example of the system according to the second embodiment. As illustrated in FIG. 14, the system includes cameras 10a to 10d, display devices 15a to 15d, and an information processing device 200. The cameras 10a to 10d, the display devices 15a to 15d, and the information processing device 100 are coupled to each other via a network.

Description regarding the cameras 10a to 10d is similar to the description in the first embodiment. In a case where the cameras 10a to 10d are not particularly distinguished, the cameras 10a to 10d are referred to as a "camera 10".

Description regarding the display devices 15a to 15d is similar to that in the first embodiment. In a case where the display devices 15a to 15d are not particularly distinguished, the display devices 15a to 15d are referred to as a "display device 15".

The information processing device 200 specifies a cluster to which a customer belongs, based on features of the customer. Furthermore, the information processing device 200 generates an avatar corresponding to the specified cluster and displays the generated avatar on the display device 15.

Processing for specifying the cluster to which the customer belongs by the information processing device 200 will be described. The information processing device 200 performs clustering of the customer, based on features of a plurality of customers registered in advance and classifies the customers into the clusters. The features of the customer include a behavior type of the customer, an age of the customer, a gender of the customer, or the like. The behavior type of the customer, the age of the customer, and the gender of the customer may be converted into a numerical value (feature amount) such as a vector, using the related art.

Figure 15:
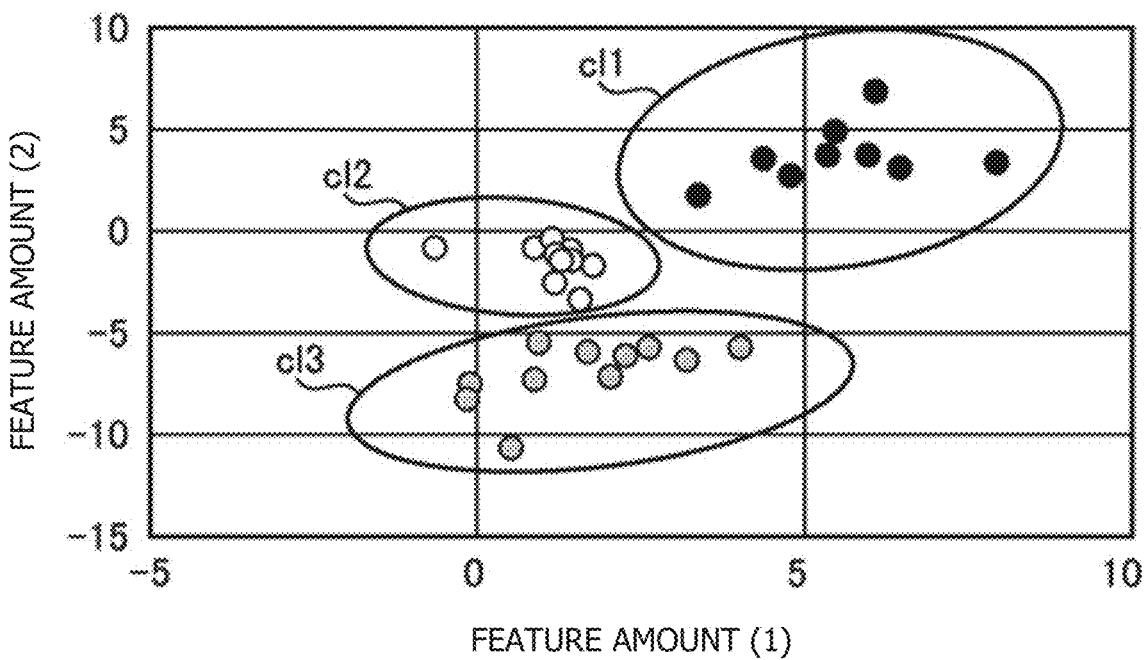
FIG. 15 is a diagram for explaining clustering according to the second embodiment.

FIG. 15 is a diagram for explaining the clustering according to the second embodiment. In FIG. 15, for convenience of description, feature points of the features of the plurality of customers is illustrated in a feature space represented by two axes of a feature amount (1) and a feature amount (2). For example, the information processing device 200 classifies the plurality of feature points (customers corresponding to feature points) into clusters cl1, cl2, and cl3, based on a k-means method or the like. Note that the clusters cl1 to cl3 are examples, and there may be a case where the plurality of customers is classified into three or more clusters.

Here, in a case where a new customer is classified into a cluster, the information processing device 200 executes the following processing. The information processing device 200 generates a feature point, based on a behavior type of the customer, an age of the customer, and a gender of the customer, for the new customer. The information processing device 200 compares distances from the generated feature point and the respective clusters cl1 to cl3, in the feature space and specifies a cluster having a shortest distance to the generated feature point as a cluster corresponding to the new customer. In a case of calculating the distance to the cluster, the information processing device 200 may use a center of gravity of the cluster and may use a feature point closest to the feature point of the new customer, from among the plurality of feature points included in the cluster.

The information processing device 200 executes presentation processing and update processing, as in the first embodiment.

First, the presentation processing executed by the information processing device 200 will be described. The information processing device 200 displays avatars of a plurality of customer service styles (image of avatar) on the display device 15, based on a customer service style DB 241.

FIG. 16 is a diagram illustrating an example of a data structure of the customer service style DB according to the second embodiment. As illustrated in FIG. 16, the customer service style DB 241 associates a cluster, a prompt, and a presentation ratio of a customer service style (prompt) to be presented to the customer.

In FIG. 16, as initial values of the prompts, prompts 20-1, 20-2, and 20-3 are set. Description regarding the prompts 20-1 to 20-3 is similar to that described in FIG. 2.

In FIG. 16, a presentation ratio at which an avatar of the prompt 20-1 is presented to a customer belonging to the cluster cl1 is "33%". A presentation ratio at which an avatar of the prompt 20-2 is presented to the customer belonging to the cluster cl1 is "33%". A presentation ratio at which an avatar of the prompt 20-3 is presented to the customer belonging to the cluster cl1 is "33%".

A presentation ratio at which the avatar of the prompt 20-1 is presented to a customer belonging to the cluster cl2 is "33%". A presentation ratio at which the avatar of the prompt 20-2 is presented to the customer belonging to the cluster cl2 is "33%". A presentation ratio at which the avatar of the prompt 20-3 is presented to the customer belonging to the cluster cl2 is "33%".

For example, the information processing device 200 specifies a feature of the customer, by analyzing video data of the camera 10*a* and specifies a cluster to which the customer belongs, based on a distance between the feature point of the feature and each cluster. In a case where the customer belongs to the cluster cl1, the information processing device 200 selects the prompt based on the presentation ratio corresponding to the cluster cl1 of the customer service style DB 241 and displays an image of an avatar based on the selected prompt, on the display device 15*a*.

Returning to the description in FIG. 14, the update processing executed by the information processing device 200 will be described. The information processing device 200 calculates an occurrence rate of a predetermined purchase behavior of the customer for the avatar of each customer service style (prompt), for each cluster, by analyzing the video data of the camera 10 and registers the occurrence rate in an occurrence rate DB 242. The information processing device 200 updates a customer service style (prompt) for each cluster registered in the customer service style DB 241, based on the occurrence rate for each customer service style and for each cluster, registered in the occurrence rate DB 242. In the second embodiment, as an example, the predetermined purchase behavior of the customer is set as a "behavior for stretching hand to product" of the customer in front of a product shelf.

FIG. 17 is a diagram illustrating an example of a data structure of the occurrence rate DB according to the second embodiment. As illustrated in FIG. 17, the occurrence rate DB 242 associates the plurality of attributes, the plurality of prompts, and an occurrence rate of a stopping behavior. In FIG. 17, as the initial values of the prompts, the prompts 20-1 to 20-3 are set. Description regarding the prompts 20-1 to 20-3 is similar to that described in FIG. 2 or the like.

In FIG. 17, a rate (occurrence rate) at which the customer belonging to the cluster cl1 stretches the hand to the product due to display of the avatar of the prompt 20-1 is "15%". A rate at which the customer belonging to the cluster cl1 stretches the hand to the product due to display of the avatar of the prompt 20-2 is "60%". A rate at which the customer belonging to the cluster cl1 stretches the hand to the product due to display of the avatar of the prompt 20-3 is "25%".

A rate (occurrence rate) at which the customer belonging to the cluster cl2 stretches the hand to the product due to the display of the avatar of the prompt 20-1 is "70%". A rate at which the customer belonging to the cluster cl2 stretches the hand to the product due to the display of the avatar of the prompt 20-2 is "20%". A rate at which the customer belonging to the cluster cl2 stretches the hand to the product due to the display of the avatar of the prompt 20-3 is "10%".

The information processing device 200 executes first update processing and second update processing, similarly to the information processing device 100 according to the first embodiment. Note that the first update processing and the second update processing in the second embodiment are similar processing except that an attribute (first attribute, second attribute, . . . ) of a user is replaced with a cluster (clusters cl1, cl2, . . . ) to which the user belongs. Therefore, description thereof is omitted.

As described above, the information processing device 200 according to the second embodiment calculates the occurrence rate of the predetermined purchase behavior of the customer for the avatar of each customer service style (prompt), for each cluster to which the customer belongs, by analyzing the video data of the camera 10 and registers the occurrence rate in the occurrence rate DB 242. The information processing device 200 updates a customer service style (prompt) for each cluster to which the customer belongs registered in the customer service style DB 241, based on the occurrence rate for each customer service style and for each cluster to which the customer belongs, registered in the occurrence rate DB 242. As a result, it is possible to set an avatar effective for sales measures, for each cluster to which the customer belongs.

Figure 18:
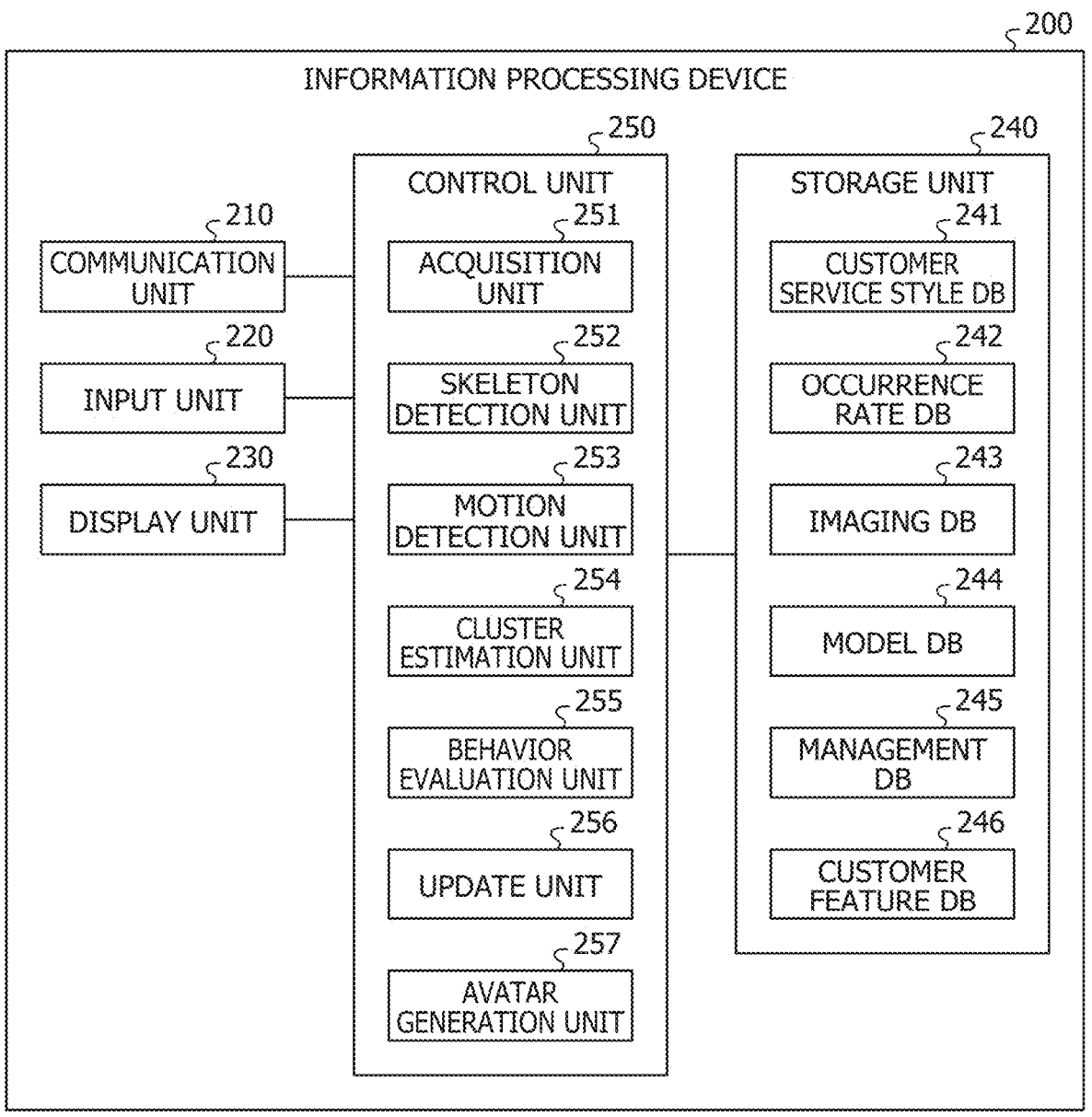
FIG. 18 is a functional block diagram illustrating a configuration of an information processing device according to the second embodiment.

Next, a configuration example of the information processing device 200 that executes the above processing will be described. FIG. 18 is a functional block diagram illustrating a configuration of the information processing device according to the second embodiment. As illustrated in FIG. 18, the information processing device 200 includes a communication unit 210, an input unit 220, a display unit 230, a storage unit 240, and a control unit 250.

Description regarding the communication unit 210, the input unit 220, and the display unit 230 is similar to the description regarding the communication unit 110, the input unit 120, and the display unit 130 described with reference to FIG. 6.

The storage unit 240 includes the customer service style DB 241, the occurrence rate DB 242, an imaging DB 243, a model DB 244, a management DB 245, and a customer feature DB 246. The storage unit 240 is a storage device such as a memory.

The customer service style DB 241 associates the cluster to which the customer belongs, the prompt, and the presentation ratio of the customer service style (prompt) to be presented to the customer. Other description of the customer service style DB 241 is similar to the description made regarding the customer service style DB 241 described with reference to FIG. 16.

The occurrence rate DB 242 associates a plurality of belonging clusters, a plurality of prompts, and an occurrence rate of the behavior for stretching the hand to the product. Other description regarding the occurrence rate DB 242 is similar to the description regarding the occurrence rate DB 242 described in FIG. 17.

The imaging DB 243 holds the video data imaged by the camera 10. Other description regarding the imaging DB 243 is similar to the description regarding the imaging DB 143 described with reference to FIG. 7.

The model DB 244 includes a plurality of machine learning models used by the control unit 250. Other description regarding the model DB 244 is similar to the description regarding the model DB 144 in the first embodiment.

The management DB 245 holds various types of information regarding the camera 10 and the display device 15. Other description regarding the management DB 145 is similar to the description regarding the management DB 145 described with reference to FIG. 10.

In the customer feature DB 246, features of a plurality of customers is registered in advance. The features of the customer include a behavior type of the customer, an age of the customer, a gender of the customer, or the like. The behavior type of the customer, the age of the customer, and the gender of the customer are converted into numerical values (feature amount) such as a vector, using the related art. The customer feature DB 246 is used in a case where the cluster described in FIG. 15 is set.

Subsequently, the description proceeds to description of the control unit 250. The control unit 250 includes an acquisition unit 251, a skeleton detection unit 252, a motion detection unit 253, a cluster estimation unit 254, a behavior evaluation unit 255, an update unit 256, and an avatar generation unit 257. The control unit 250 is a CPU, a GPU, or the like.

The acquisition unit 251 acquires the video data from the camera 10. The acquisition unit 251 stores the acquired video data in the imaging DB 243, in association with camera identification information of the camera.

The skeleton detection unit 252 acquires the video data from the imaging DB 243 and generates time-series skeleton data based on the video data. The skeleton detection unit 252 outputs the time-series skeleton data to the motion detection unit 253. Other description regarding the skeleton detection unit 252 is similar to the description regarding the skeleton detection unit 152 in the first embodiment.

The motion detection unit 253 divides the time-series skeleton data for each predetermined period and inputs the time-series skeleton data in the predetermined period into the second machine learning model, so as to detect a behavior type of a person in the predetermined period. By repeatedly executing the above processing for each predetermined period, the motion detection unit 253 outputs the behavior type of the person for each predetermined period to the cluster estimation unit 254 and the behavior evaluation unit 255. Other description regarding the motion detection unit 253 is similar to the description regarding the motion detection unit 153 in the first embodiment.

The cluster estimation unit 254 specifies the feature of the customer by executing the following processing and estimates the cluster to which the customer belongs. For example, the cluster estimation unit 254 executes pre-processing and estimation processing.

Next, the pre-processing executed by the cluster estimation unit 254 will be described. The cluster estimation unit 254 performs clustering on the features of the plurality of customers registered in the customer feature DB 246, in advance, and classifies the plurality of customers into the plurality of clusters. The clustering performed by the cluster estimation unit 254 is similar to the processing described with reference to FIG. 15.

The estimation processing executed by the cluster estimation unit 254 will be described. The cluster estimation unit 254 estimates the attribute (age, gender) of the customer, similarly to the attribute estimation unit 154 in the first embodiment. The cluster estimation unit 254 generates a feature of the customer to be a cluster estimation target, based on the estimated attribute of the customer and the behavior type acquired from the motion detection unit 253.

The cluster estimation unit 254 estimates the cluster to which the customer belongs, based on a distance between the plurality of clusters generated in the pre-processing and a feature point of the feature of the customer to be estimated. For example, as described with reference to FIG. 15, the cluster estimation unit 254 compares the distances to the respective clusters cl1 to cl3 and specifies a cluster having a distance closest to the generated feature point as a cluster corresponding to the customer to be estimated.

The cluster estimation unit 254 outputs the cluster, to which the person belongs, to be the estimation result, to the behavior evaluation unit 255 and the avatar generation unit 257. It is assumed that the cluster estimation unit 254 set a person ID, the camera identification information of the camera 10 that has imaged the video data, and time data of the image frame, to information regarding the cluster to which the person belongs. The cluster estimation unit 254 sets the same person ID, to the attribute of the same person, by performing tracking or the like on the time-series image frames.

The cluster estimation unit 254 registers the feature of the customer in the customer feature DB 246, each time when the estimated feature of the customer is estimated. The cluster estimation unit 254 may execute the pre-processing described above, for each predetermined period.

The avatar generation unit 257 selects the prompt based on the cluster to which the person belongs, acquired from the cluster estimation unit 254 and the customer service style DB 241. The avatar generation unit 257 generates the image of the avatar based on the selected prompt and displays the generated image of the avatar on the display device 15. The processing of the avatar generation unit 257 corresponds to the presentation processing described above.

In a case where the cluster to which the person belongs is the cluster cl1, the avatar generation unit 257 selects the prompt, based on a presentation ratio set to a record of the cluster cl1 in the customer service style DB 241 (FIG. 16). Furthermore, the avatar generation unit 257 specifies the display device that displays the image of the avatar, based on camera identification information set to the information regarding the cluster to which the person belongs, acquired from the cluster estimation unit 254 and the management DB 245. In a case where the camera identification information is "C-10a", the image of the avatar is displayed on the display device 15a of display device identification information "D-15a".

Note that, when displaying the image of the avatar on the display device 15, the avatar generation unit 257 outputs display history information in which information regarding the prompt to be a generation source of the image of the avatar, a time when the image of the avatar is displayed, and display device identification information of the display device 15 that displays the image of the avatar are associated with each other, to the behavior evaluation unit 255.

The behavior evaluation unit 255 updates the occurrence rate DB 242, based on the display history information, the behavior type of the person for each predetermined period acquired from the motion detection unit 253, and the cluster to which the person belongs, acquired from the cluster estimation unit 254.

For example, the behavior evaluation unit 255 associates the cluster to which the person belongs, information regarding the prompt referred by the person, and the behavior type of the person, for each person, based on the display history information described above, the behavior type of the person for each predetermined period, and the information regarding the cluster to which the person belongs. The behavior evaluation unit 255 specifies the number of detected persons and the number of persons who has performed the behavior for stretching the hand to the product, for each cluster to which the person belongs and for each prompt and calculates an occurrence rate of the behavior for stretching the hand to the product. The behavior evaluation unit 255 updates the occurrence rate DB 242, based on the calculation result.

The update unit 256 updates the prompt of the customer service style DB 241, by executing the first update processing and the second update processing. The first update processing executed by the update unit 256 is the update processing described with reference to FIG. 4 and is similar to the processing in which the attribute of the person is replaced with the cluster. The second update processing executed by the update unit 256 is the update processing described with reference to FIG. 5 and is similar to the processing in which the attribute of the person is replaced with the cluster. The update unit 256 repeatedly executes the first update processing and the second update processing, until the significant difference in the occurrence rate between the respective prompts is eliminated. Note that the update unit 256 may repeatedly execute the first update processing and the second update processing only a preset number of times.

Other processing regarding the update unit 256 is similar to the description regarding the update unit 126 described in the first embodiment.

Next, a processing procedure (presentation processing and update processing) of the information processing device 200 according to the second embodiment will be described. FIG. 19 is a flowchart illustrating a processing procedure of the presentation processing according to the second embodiment. As illustrated in FIG. 19, the acquisition unit 251 of the information processing device 200 acquires the video data from the camera 10 (step S301).

The skeleton detection unit 252 and the cluster estimation unit 254 of the information processing device 200 detect a person region from image data included in the video data (step S302). The skeleton detection unit 252 generates the time-series skeleton data (step S303).

The motion detection unit 253 of the information processing device 200 detects the behavior type of the person, based on the time-series skeleton data (step S304). The cluster estimation unit 254 estimates the attribute of the person, based on an image of the person region (step S305). The cluster estimation unit 254 estimates the cluster to which the person belongs, based on the image of the person region (step S306).

The avatar generation unit 257 of the information processing device 200 selects the prompt, based on the cluster to which the person belongs and the customer service style DB 241 (step S307). The avatar generation unit 257 generates the avatar, based on the selected prompt (step S308).

The avatar generation unit 257 displays the generated avatar on the display device 15 (step S309). In a case where processing is continued (step S310, Yes), the information processing device 200 proceeds the procedure to step S301. On the other hand, in a case where the processing is not continued (step S310, No), the information processing device 200 ends the processing.

Figure 20:
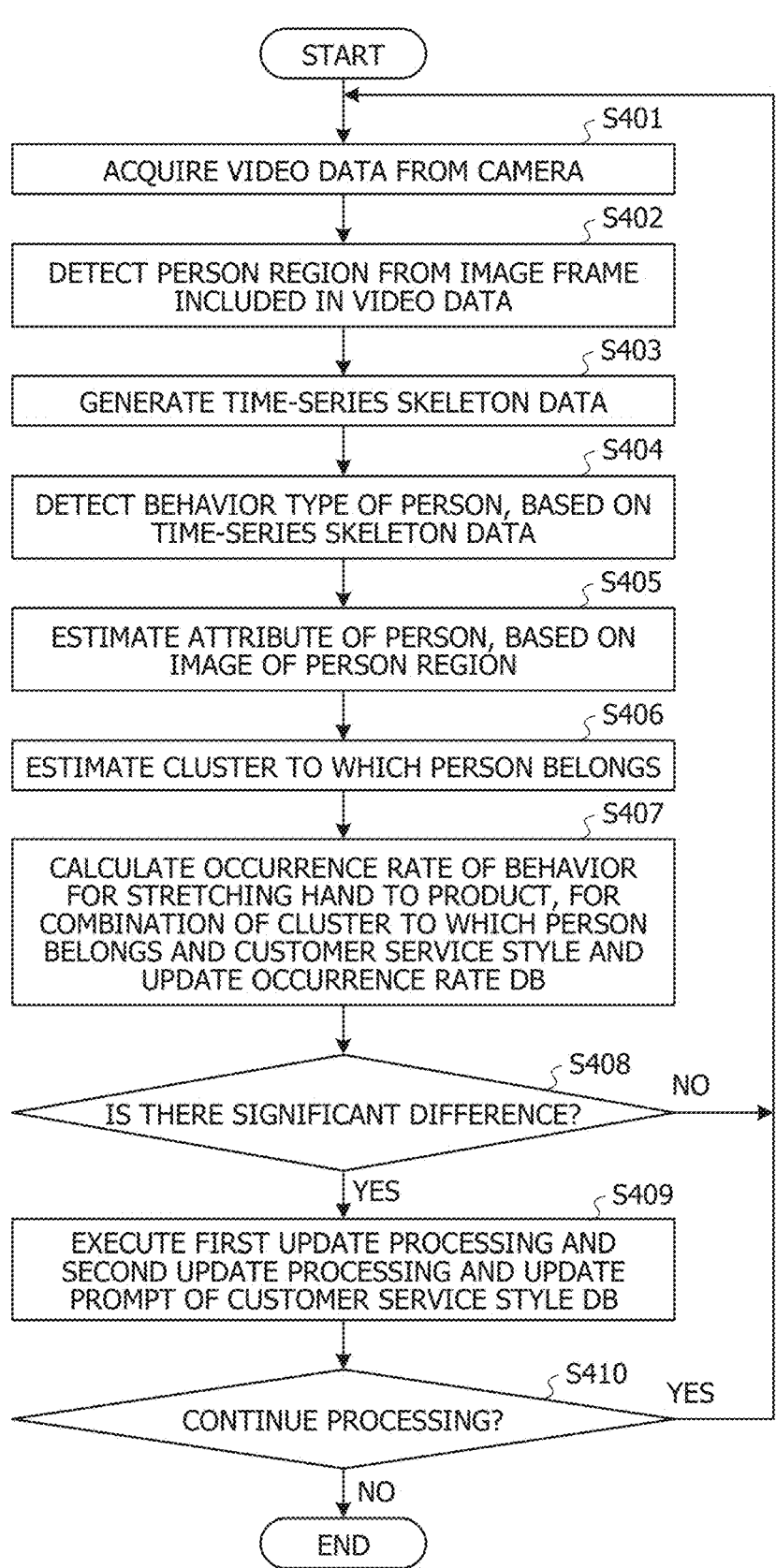
FIG. 20 is a flowchart illustrating a processing procedure of update processing according to the second embodiment.

FIG. 20 is a flowchart illustrating a processing procedure of the update processing according to the second embodiment. As illustrated in FIG. 20, the acquisition unit 251 of the information processing device 100 acquires the video data from the camera 10 (step S401). The skeleton detection unit 252 and the cluster estimation unit 254 of the information processing device 200 detect the person region from the image data included in the video data (step S402). The skeleton detection unit 252 generates the time-series skeleton data (step S403).

The motion detection unit 253 of the information processing device 200 detects the behavior type of the person, based on the time-series skeleton data (step S404). The cluster estimation unit 254 estimates the attribute of the person, based on the image of the person region (step S405). The cluster estimation unit 254 estimates the cluster to which the person belongs, based on the image of the person region (step S406).

The behavior evaluation unit 255 of the information processing device 200 calculates the occurrence rate of the behavior for stretching the hand to the product, for a combination of the cluster to which the person belongs and the customer service style (prompt) and updates the occurrence rate DB 242 (step S407).

In a case where there is no significant difference between the prompts set to the occurrence rate DB 242 (step S408, No), the information processing device 200 proceeds the procedure to step S401. On the other hand, in a case where there is a significant difference between the prompts set to the occurrence rate DB 242 (step S408, Yes), the information processing device 200 proceeds the procedure to step S409.

The update unit 256 of the information processing device 200 executes the first update processing and the second update processing and updates the prompt of the customer service style DB 241 (step S409). In a case where processing is continued (step S410, Yes), the information processing device 200 proceeds the procedure to step S401. On the other hand, in a case where the processing is not continued (step S410, No), the information processing device 200 ends the processing.

Next, effects of the information processing device 200 according to the second embodiment will be described. The information processing device 200 according to the second embodiment calculates the occurrence rate of the predetermined purchase behavior of the customer for the avatar of each customer service style (prompt), for each cluster to which the customer belongs, by analyzing the video data of the camera 10 and registers the occurrence rate in the occurrence rate DB 242. The information processing device 200 updates the customer service style (prompt) for each cluster to which the customer belongs registered in the customer service style DB 241, based on the occurrence rate for each customer service style and for each cluster to which the customer belongs, registered in the occurrence rate DB 242. As a result, it is possible to set an avatar effective for sales measures, for each cluster to which the customer belongs.

Figure 21:
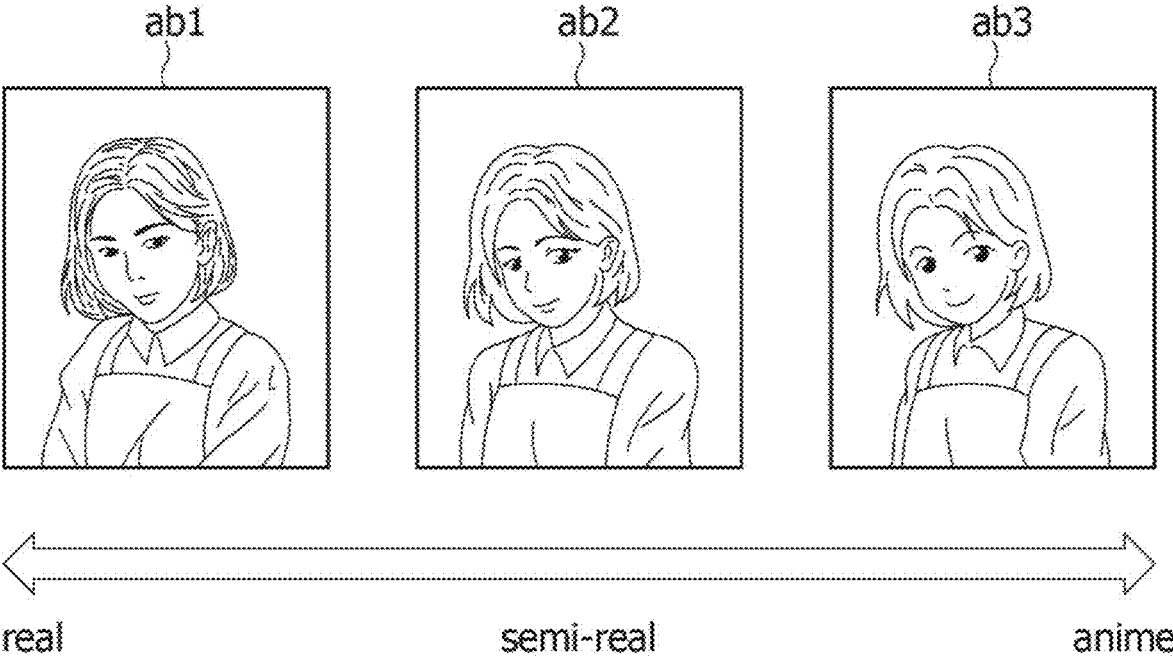
FIG. 21 is a diagram illustrating an example of images of avatars generated by other keywords of prompts.

Meanwhile, in the first and second embodiments described above, the description has been made using cool, base, and caring as the keywords of the prompts. However, other keywords may be used. For example, the information processing devices 100 and 200 may use real, semi-real, anime, or the like, as the keyword of the prompt. FIG. 21 is a diagram illustrating an example of images of avatars generated by the other keywords of the prompts. For example, as a weight of the keyword real of the prompt approaches one, the image of the avatar approaches an image ab1. As a weight of the keyword semi-real of the prompt approaches one, the image of the avatar approaches an image ab2. As a weight of the keyword anime of the prompt approaches one, the image of the avatar approaches an image ab3.

Note that the above-described information processing device 100 (200) according to the present embodiment searches for an optimum value, by dividing (interpolating) the feature space of the prompt, as described in the first update processing in FIG. 4. However, the information processing device 100 (200) may search for the optimum value, by extending (extrapolating) the feature space of the prompt.

Figure 22:
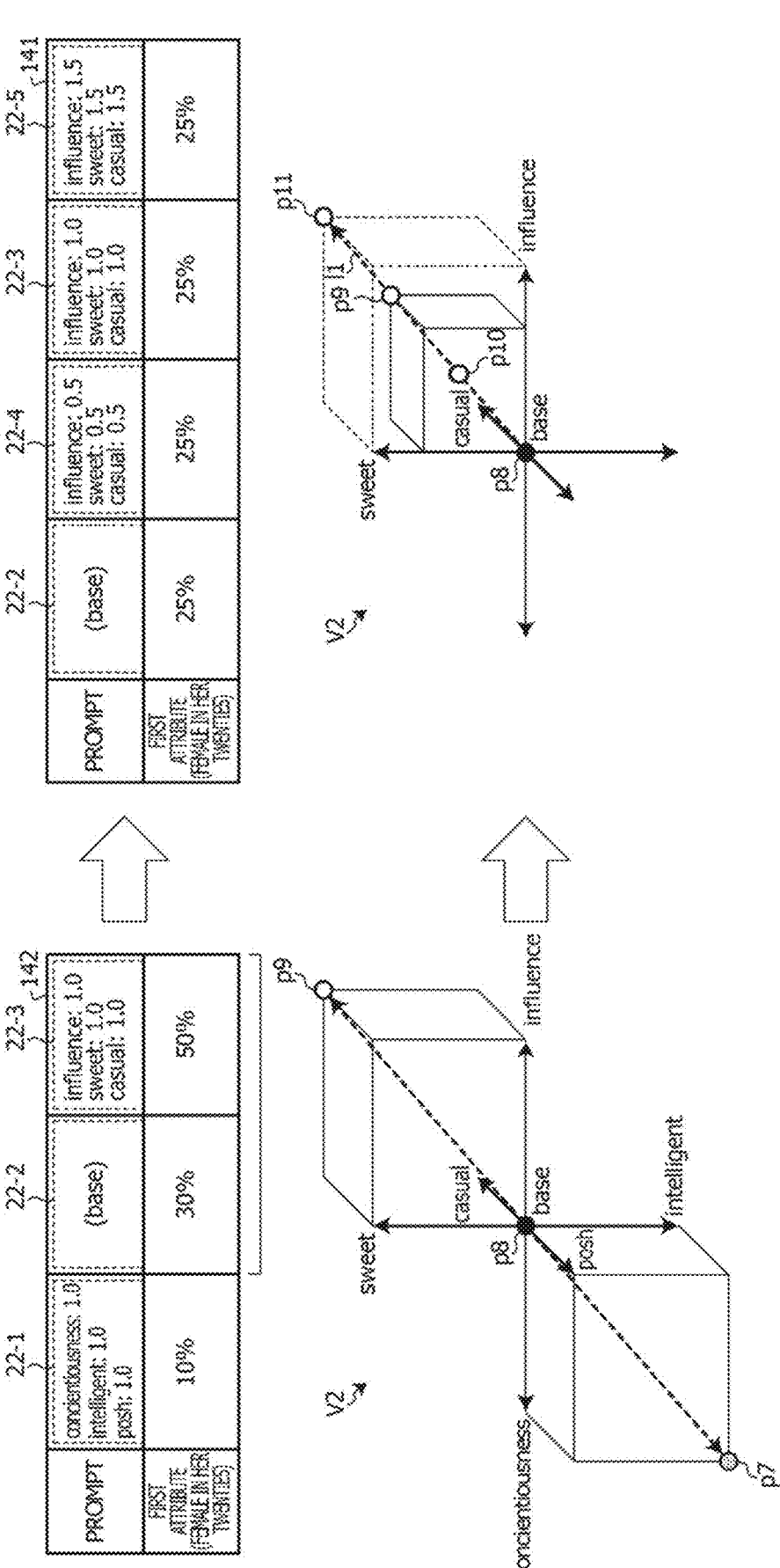
FIG. 22 is a diagram for explaining another first update processing.
Figure 24:
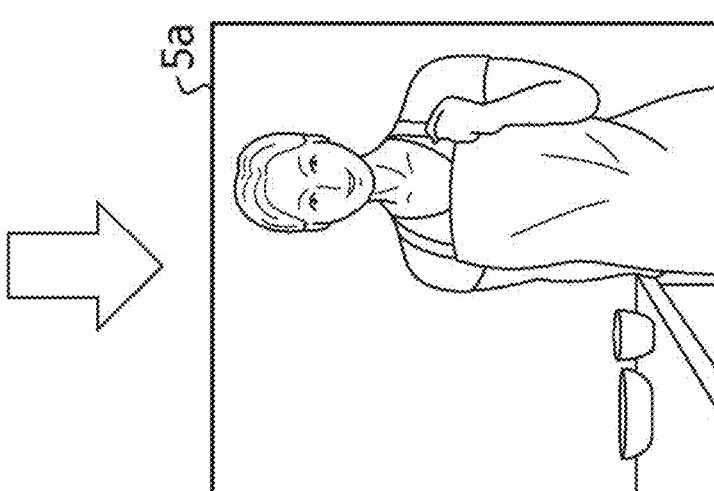
FIG. 24 is a diagram illustrating an example of the prompt.

FIG. 22 is a diagram for explaining another first update processing. In FIG. 22, the description will be made by using the occurrence rate of each stopping behavior of the first attribute (female in her twenties) in the occurrence rate DB 142. In FIG. 22, for convenience of description, description will be made as assuming that occurrence rates of prompts 22-1 to 22-3 for the first attribute are respectively 10%, 30%, and 50%.

For example, the prompt 22-1 includes "conscientiousness: 1.0, intelligent: 1.0, posh: 1.0". The prompt 22-2 is a prompt to be a "base (base)". The prompt to be the base is a prompt that does not depend on a customer service style. The prompt 22-3 includes "influence: 1.0, sweet: 1.0, casual: 1.0".

A position of the prompt 22-1 is a position p7, in a feature space V2 of the prompt. A position of the prompt 22-2 is a position p8, in the feature space V2 of the prompt. A position of the prompt 22-3 is a position p9, in the feature space V2 of the prompt.

The information processing device 100 (200) scans each occurrence rate of the first attribute in the occurrence rate DB 142 and determines whether or not there is a significant difference in the occurrence rate between the respective prompts. For example, the information processing device 100 sets a threshold (for example, 20%) in advance and compares the threshold with other occurrence rate, and then determines that there is a significant difference in the occurrence rate in a case where there is a prompt with a higher occurrence rate that is equal to or more than the threshold.

In the example illustrated in FIG. 22, an occurrence rate "30%" of the prompt 22-2 is equal to or more than the threshold, as compared with an occurrence rate "10%" of the prompt 22-1. Furthermore, an occurrence rate "50%" of the prompt 22-3 is equal to or more than the threshold, as compared with the occurrence rate "10%" of the prompt 22-1. Therefore, in the example illustrated in FIG. 22, the information processing device 100 determines that there is a significant difference in the occurrence rate.

In a case of determining that there is the significant difference in the occurrence rate, in the first update processing, the information processing device 100 selects a prompt with a largest occurrence rate and a prompt with a second largest occurrence rate and searches for a midpoint of the selected prompts. Moreover, the information processing device 100 selects the prompt with the largest occurrence rate and the prompt with the second largest occurrence rate and specifies an outer point on a line segment passing through points of the selected prompts.

In the example illustrated in FIG. 22, the information processing device 100 selects the prompt 22-3 with the largest occurrence rate and the prompt 22-2 with the second largest occurrence rate. The information processing device 100 searches for a position p10 corresponding to a midpoint of the position p9 of the prompt 22-3 and the position p8 of the prompt 22-2, in the feature space V2. A prompt corresponding to the position p10 is "influence: 1.0, sweet: 1.0, casual: 1.0".

Furthermore, the information processing device 100 specifies a position p11 outside the position p9, on a line segment 11 passing through the positions p8 and p9. For example, a distance between the position p9 and the position p11 may be a preset distance. A prompt corresponding to the position p11 is "influence: 1.5, sweet: 1.5, casual: 1.5".

The information processing device 100 updates the prompt corresponding to the first attribute registered in the customer service style DB 141, based on the above calculation result. Specifically, the information processing device 100 updates the prompt corresponding to the first attribute to prompts 22-2, 22-4, 22-3, and 22-5. To the prompt 22-4, a value corresponding to the position p10 searched in FIG. 22 is set. To the prompt 22-5, a value corresponding to the position p11 searched in FIG. 22 is set. Note that the information processing device 100 sets each presentation ratio to "25%" so that the presentation ratios of the respective prompts in the customer service style DB 141 are uniform.

Next, an example of a hardware configuration of a computer that implements functions similar to those of the information processing devices 100 and 200 described above will be described. FIG. 23 is a diagram illustrating an example of a hardware configuration of a computer that implements functions similar to those of the information processing device according to the embodiment.

As illustrated in FIG. 23, a computer 300 includes a CPU 301 that executes various types of arithmetic processing, an input device 302 that receives data input from a user, and a display 303. Furthermore, the computer 300 includes a communication device 304 that exchanges data with an external device or the like via a wired or wireless network, and an interface device 305. Furthermore, the computer 300 includes a random access memory (RAM) 306 that temporarily stores various types of information, and a hard disk device 307. Then, each of the devices 301 to 307 is coupled to a bus 308.

The hard disk device 307 includes an acquisition program 307a, a skeleton detection program 307b, a motion detection program 307c, an estimation program 307d, and a behavior evaluation program 307e. The hard disk device 307 includes an update program 307f and an avatar generation program 307g. The CPU 301 reads each of the programs 307a to 307g and develops the programs in the RAM 306.

The acquisition program 307a functions as an acquisition process 306a. The skeleton detection program 307b functions as a skeleton detection process 306b. The motion detection program 307c functions as a motion detection process 306c. The estimation program 307d functions as an estimation process 306d. The behavior evaluation program 307e functions as a behavior evaluation process 306e. The update program 307f functions as an update process 306f. The avatar generation program 307g functions as an avatar generation process 306g.

Processing of the acquisition process 306a corresponds to the processing of the acquisition units 151 and 251. Processing of the skeleton detection process 306b corresponds to the processing of the skeleton detection units 152 and 252. Processing of the motion detection process 306c corresponds to the processing of the motion detection units 153 and 253. Processing of the estimation process 306d corresponds to the processing of the attribute estimation unit 154 or the cluster estimation unit 254. Processing of the behavior evaluation process 306e corresponds to the processing of the behavior evaluation units 155 and 255. Processing of the update process 306f corresponds to the processing of the update units 156 and 256. Processing of the avatar generation process 306g corresponds to the processing of the avatar generation units 157 and 257.

Note that each of the programs 307a to 307g may not necessarily be stored in the hard disk device 307 in advance. For example, each of the programs is stored in a "portable physical medium" to be inserted in the computer 300, such as a flexible disk (FD), a compact disc read only memory (CD-ROM), a digital versatile disc (DVD), a magneto-optical disk, or an integrated circuit (IC) card. Then, the computer 300 may read and execute each of the programs 307a to 307g.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an avatar generating program for causing a computer to execute a process comprising:

acquiring a video obtained by imaging an area that includes a product shelf on which a product is arranged;

specifying a behavior of a person and a feature regarding the person by analyzing the acquired video;

classifying the specified feature based on a predetermined condition;

acquiring a customer service style that is expressed by an avatar displayed in a visually recognizable manner for each person and that is for the product;

calculating an occurrence rate of a behavior related to purchase of the product, for each classified feature, based on the specified behavior, for the customer service style; and updating the customer service style, for each classified feature, based on the occurrence rate.

2. The non-transitory computer-readable recording medium according to claim 1, wherein the process of calculating calculates the occurrence rate for a plurality of the customer service styles to which different parameters are respectively set, for each classified feature, and the process of updating executes first update process of selecting a plurality of customer service styles with the larger occurrence rate than other customer service styles, from among a plurality of customer service styles for a certain feature and updating the customer service style for the certain feature, based on parameters set to the plurality of selected customer service styles.

3. The non-transitory computer-readable recording medium according to claim 2, wherein the process of updating further executes second update process of selecting a customer service style with the largest occurrence rate from among the plurality of customer service styles for the certain feature and updating the customer service style for the certain feature, based on a parameter set to the selected customer service style.

4. The non-transitory computer-readable recording medium according to claim 3, wherein the process of updating repeatedly executes the first update process and the second update process until the occurrence rate for the plurality of customer service styles satisfies a predetermined condition.

5. The non-transitory computer-readable recording medium according to claim 1, wherein the process of calculating the occurrence rate calculates an occurrence rate for a certain customer service style, by dividing the number of times of the behavior related to the purchase of the product for the certain customer service style included in the plurality of customer service styles to which the different parameters are respectively set by the number of detected persons for the plurality of customer service styles.

6. The non-transitory computer-readable recording medium according to claim 1, for causing the computer to execute the process further comprising:

setting a plurality of clusters, by performing clustering on features regarding a plurality of persons, wherein the process of classifying classifies the feature regarding the person into any one of the clusters, based on a distance between the feature regarding the person and the plurality of clusters.

7. An avatar generating method for a computer to execute a process comprising:

acquiring a video obtained by imaging an area that includes a product shelf on which a product is arranged;

specifying a behavior of a person and a feature regarding the person by analyzing the acquired video;

classifying the specified feature based on a predetermined condition;

acquiring a customer service style that is expressed by an avatar displayed in a visually recognizable manner for each person and that is for the product;

calculating an occurrence rate of a behavior related to purchase of the product, for each classified feature, based on the specified behavior, for the customer service style; and updating the customer service style, for each classified feature, based on the occurrence rate.

8. The avatar generating method according to claim 7, wherein the process of calculating calculates the occurrence rate for a plurality of the customer service styles to which different parameters are respectively set, for each classified feature, and the process of updating executes first update process of selecting a plurality of customer service styles with the larger occurrence rate than other customer service styles, from among a plurality of customer service styles for a certain feature and updating the customer service style for the certain feature, based on parameters set to the plurality of selected customer service styles.

9. The avatar generating method according to claim 8, wherein the process of updating further executes second update process of selecting a customer service style with the largest occurrence rate from among the plurality of customer service styles for the certain feature and updating the customer service style for the certain feature, based on a parameter set to the selected customer service style.

10. The avatar generating method according to claim 9, wherein the process of updating repeatedly executes the first update process and the second update process until the occurrence rate for the plurality of customer service styles satisfies a predetermined condition.

11. The avatar generating method according to claim 7, wherein the process of calculating the occurrence rate calculates an occurrence rate for a certain customer service style, by dividing the number of times of the behavior related to the purchase of the product for the certain customer service style included in the plurality of customer service styles to which the different parameters are respectively set by the number of detected persons for the plurality of customer service styles.

12. The avatar generating method according to claim 7, for causing the computer to execute the process further comprising:

setting a plurality of clusters, by performing clustering on features regarding a plurality of persons, wherein the process of classifying classifies the feature regarding the person into any one of the clusters, based on a distance between the feature regarding the person and the plurality of clusters.

13. An information processing device comprising:

a memory; and a processor coupled to the memory and configured to:

acquire a video obtained by imaging an area that includes a product shelf on which a product is arranged;

specify a behavior of a person and a feature regarding the person by analyzing the acquired video;

classify the specified feature based on a predetermined condition;

acquire a customer service style that is expressed by an avatar displayed in a visually recognizable manner for each person and that is for the product;

calculate an occurrence rate of a behavior related to purchase of the product, for each classified feature, based on the specified behavior, for the customer service style; and update the customer service style, for each classified feature, based on the occurrence rate.

14. The information processing device according to claim 13, wherein the process of calculating calculates the occurrence rate for a plurality of the customer service styles to which different parameters are respectively set, for each classified feature, and the process of updating executes first update process of selecting a plurality of customer service styles with the larger occurrence rate than other customer service styles, from among a plurality of customer service styles for a certain feature and updating the customer service style for the certain feature, based on parameters set to the plurality of selected customer service styles.

15. The information processing device according to claim 14, wherein the process of updating further executes second update process of selecting a customer service style with the largest occurrence rate from among the plurality of customer service styles for the certain feature and updating the customer service style for the certain feature, based on a parameter set to the selected customer service style.

16. The information processing device according to claim 15, wherein the process of updating repeatedly executes the first update process and the second update process until the occurrence rate for the plurality of customer service styles satisfies a predetermined condition.

17. The information processing device according to claim 13, wherein the process of calculating the occurrence rate calculates an occurrence rate for a certain customer service style, by dividing the number of times of the behavior related to the purchase of the product for the certain customer service style included in the plurality of customer service styles to which the different parameters are respectively set by the number of detected persons for the plurality of customer service styles.

18. The information processing device according to claim 13, the processer further configured to:

set a plurality of clusters, by performing clustering on features regarding a plurality of persons, wherein the process of classifying classifies the feature regarding the person into any one of the clusters, based on a distance between the feature regarding the person and the plurality of clusters.

* * * * *